(12) United States Patent
Venkatesan et al.

(10) Patent No.: US 12,393,720 B2
(45) Date of Patent: Aug. 19, 2025

(54) BLIND SUBPOENA PROTECTION

(71) Applicant: Microsoft Technology Licensing, LLC, Redmond, WA (US)

(72) Inventors: Ramarathnam Venkatesan, Redmond, WA (US); Nishanth Chandran, Bangalore (IN); Panagiotis Antonopoulos, Redmond, WA (US); Srinath T. V. Setty, Redmond, WA (US); Basil Cherian, Bellevue, WA (US); Daniel John Carroll, Jr., Columbia, MD (US); Jason Sydney Barnwell, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 266 days.

(21) Appl. No.: 17/938,711

(22) Filed: Oct. 7, 2022

(65) Prior Publication Data

US 2024/0119168 A1   Apr. 11, 2024

(51) Int. Cl.
*G06F 21/62* (2013.01)
*H04L 9/08* (2006.01)
*H04L 9/32* (2006.01)

(52) U.S. Cl.
CPC .......... *G06F 21/6227* (2013.01); *H04L 9/085* (2013.01); *H04L 9/3263* (2013.01)

(58) Field of Classification Search
CPC .... G06F 21/6227; H04L 9/085; H04L 9/3263
(Continued)

(56) References Cited

U.S. PATENT DOCUMENTS 8,601,549 B2    12/2013    Dickerson
9,547,771 B2    1/2017     Roth
(Continued)

FOREIGN PATENT DOCUMENTS

| CN | 110363528 A | 10/2019 |
| CN | 114221764 A | 3/2022 |
| JP | 2022020557 A | 2/2022 |

OTHER PUBLICATIONS

"Application as Filed in U.S. Appl. No. 17/819,030", filed Aug. 11, 2022, 57 Pages.
(Continued)

*Primary Examiner* — Lan Dai T Truong
(74) *Attorney, Agent, or Firm* — Weaver IP L.L.C.

(57) ABSTRACT

Embodiments described herein enable at least one of a plurality of entities to access data protected by a security policy in response to validating respective digital access requests from the entities. The respective digital access requests are received, each comprising a proof. For each request, an encrypted secret share is obtained from a respective ledger database. Each request is validated based at least on the respective encrypted secret share and the proof, without decrypting the respective encrypted secret share. In response to validating all of the requests, a verification that an access criteria of a security policy is met is made. If so, at least one of the entities is provided with access to data protected by the security policy. In an aspect, embodiments enable a blind subpoena to be performed. In another aspect, embodiments enable the at least one entity to access the data for an isolated purpose.

20 Claims, 9 Drawing Sheets

(58) Field of Classification Search
USPC .................................................. 713/193
See application file for complete search history.

(56) References Cited

U.S. PATENT DOCUMENTS

| | | | |
|---|---|---|---|
| 10,211,977 | B1 | 2/2019 | Roth |
| 10,637,855 | B2 | 4/2020 | Mikulski |
| 10,990,689 | B1 | 4/2021 | Reiner |
| 11,036,869 | B2 | 6/2021 | Roth |
| 11,139,954 | B2 | 10/2021 | Mercuri |
| 11,424,920 | B2 | 8/2022 | Bursell |
| 11,544,409 | B2 | 1/2023 | Brannon |
| 11,593,316 | B2 | 2/2023 | Haldar |
| 11,695,555 | B2 | 7/2023 | Roth |
| 11,799,630 | B2 | 10/2023 | Zhang |
| 11,886,574 | B2 | 1/2024 | Bursell |
| 12,058,265 | B2 | 8/2024 | Khoury |
| 12,107,900 | B2 | 10/2024 | Gargaro |
| 2002/0023213 | A1 | 2/2002 | Walker |
| 2002/0138738 | A1 | 9/2002 | Sames |
| 2007/0055867 | A1 | 3/2007 | Kanungo |
| 2012/0060207 | A1 | 3/2012 | Mardikar et al. |
| 2013/0145151 | A1 | 6/2013 | Brown |
| 2015/0089575 | A1 | 3/2015 | Vepa |
| 2015/0288669 | A1 | 10/2015 | Litoiu |
| 2015/0381575 | A1 | 12/2015 | Bhargav-Spantzel et al. |
| 2017/0041148 | A1 | 2/2017 | Pearce |
| 2017/0111175 | A1 | 4/2017 | Oberhauser et al. |
| 2019/0020485 | A1 | 1/2019 | Uhr |
| 2019/0163912 | A1 | 5/2019 | Kumar |
| 2019/0258811 | A1 | 8/2019 | Ferraiolo |
| 2019/0370358 | A1 | 12/2019 | Nation |
| 2019/0394175 | A1 | 12/2019 | Zhang |
| 2020/0014537 | A1 | 1/2020 | Ortiz |
| 2020/0082401 | A1 | 3/2020 | Arora |
| 2020/0322342 | A1 | 10/2020 | Gokhale |
| 2020/0374105 | A1 | 11/2020 | Padmanabhan |
| 2020/0396222 | A1 | 12/2020 | Gargaro et al. |
| 2020/0404023 | A1 | 12/2020 | Zhu |
| 2021/0089676 | A1* | 3/2021 | Ford ............... H04L 9/0825 |
| 2021/0092607 | A1 | 3/2021 | Klinkner |
| 2021/0218742 | A1 | 7/2021 | Cook |
| 2021/0232707 | A1 | 7/2021 | Wilson |
| 2021/0233673 | A1 | 7/2021 | Zhang |
| 2021/0273931 | A1 | 9/2021 | Murdoch et al. |
| 2021/0279355 | A1 | 9/2021 | Otte |
| 2021/0303714 | A1 | 9/2021 | Yaghoobi |
| 2021/0367778 | A1* | 11/2021 | Hamel ............... G06F 16/27 |
| 2021/0377037 | A1 | 12/2021 | Antonopoulos et al. |
| 2022/0020003 | A1 | 1/2022 | Sarkar |
| 2022/0021711 | A1 | 1/2022 | Marsh |
| 2022/0138181 | A1 | 5/2022 | Irazabal |
| 2022/0188810 | A1 | 6/2022 | Doney |
| 2022/0269927 | A1 | 8/2022 | Rice |
| 2022/0271936 | A1 | 8/2022 | Doney |
| 2022/0292211 | A1 | 9/2022 | Reineke |
| 2022/0400020 | A1 | 12/2022 | Davies |
| 2022/0417254 | A1 | 12/2022 | Michaelis |
| 2023/0015569 | A1 | 1/2023 | Davies |
| 2023/0035317 | A1 | 2/2023 | Jufer |
| 2023/0336547 | A1 | 10/2023 | Damour |
| 2023/0379699 | A1 | 11/2023 | Oerton |
| 2023/0388348 | A1 | 11/2023 | Authement |
| 2024/0056424 | A1 | 2/2024 | Venkatesan |
| 2024/0089098 | A1 | 3/2024 | Venkatesan |
| 2024/0104229 | A1 | 3/2024 | Venkatesan |
| 2024/0114012 | A1 | 4/2024 | Venkatesan |
| 2024/0121081 | A1 | 4/2024 | Venkatesan |

OTHER PUBLICATIONS

International Search Report and Written Opinion received for PCT Application No. PCT/US2023/031452, Dec. 4, 2023, 11 pages.
International Search Report and Written Opinion received for PCT Application No. PCT/US23/030988, mailed on Nov. 30, 2023, 13 pages.
Non-Final Office Action mailed on Oct. 18, 2024, in U.S. Appl. No. 17/934,730, 25 pages.
Alansari., "A Blockchain-Based Approach for Secure, Transparent and Accountable Personal Data Sharing", A thesis submitted in partial fulfillment for the degree of Doctor of Philosophy, Aug. 2, 2020, 213 pages.
Antonopoulos, et al., "SQL Ledger: Cryptographically Verifiable Data in Azure SQL Database", In Proceedings of the International Conference on Management of Data, Jun. 20, 2021, pp. 2437-2449.
Final Office Action mailed on Apr. 24, 2025, in U.S. Appl. No. 17/934,730, 27 pages.
International Preliminary Report On Patentability received for PCT Application No. PCT/US23/030988, Apr. 3, 2025, 08 pages.
International Preliminary Report on Patentability received for PCT Application No. PCT/US23/031452, Apr. 17, 2025, 06 pages.
Jaroucheh, et al., "Secretation: Toward a Decentralised Identity and Verifiable Credentials Based Scalable and Decentralised Secret Management Solution", IEEE International Conference on Blockchain and Cryptocurrency, 20201, 09 Pages.
Mounnan, et al., "Efficient Distributed Access Control Using Blockchain for Big Data in Clouds", International Conference on Wireless and Mobile Communications (ICWMC), Jun. 30, 2019, pp. 53-62.
Singh, et al. , "Security for Online Transaction Based on User Location", In Journal of International Journal For Innovative Research In Multidisciplinary Field, vol. 3, Issue 4, Apr. 1, 2017, pp. 60-64.
Yue, et al. , "GlassDB: An Efficient Verifiable Ledger Database System Through Transparency", In repository of arXiv:2207.00944v2, Aug. 8, 2022, 14 Pages.

* cited by examiner

BLIND SUBPOENA PROTECTION

BACKGROUND

Public-key cryptography (also known as asymmetric cryptography) is a cryptographic system that uses pairs of keys. Each pair consists of a public key (which is known to others) and a private key (which is only known to the owner). Effective security requires keeping the private key private, whereas the public key can be openly distributed.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments described herein enable at least one of a plurality of entities to access data protected by a security policy in response to validating respective digital access requests from the entities. For example, a respective digital access request is received from the plurality of entities. Each digital access request comprises a respective proof. For each digital access request, a respective encrypted secret share is obtained from a respective ledger database. Each digital access request is validated based at least on the respective encrypted secret share and the respective proof, without decrypting the respective encrypted secret share. In response to validating all of the requests, a verification is made that an access criteria of a security policy is met. In response to verifying that the access criteria of the security policy is met, at least one of the entities is provided with access to data protected by the security policy. As an example, embodiments enable a plurality of entities to jointly enable a user's data to be accessed pursuant to a blind subpoena and without notifying the user in response to a determination that the access criteria of the security policy is met. In another example, embodiments enable the at least one entity to access the data for an isolated purpose.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Figure 1:
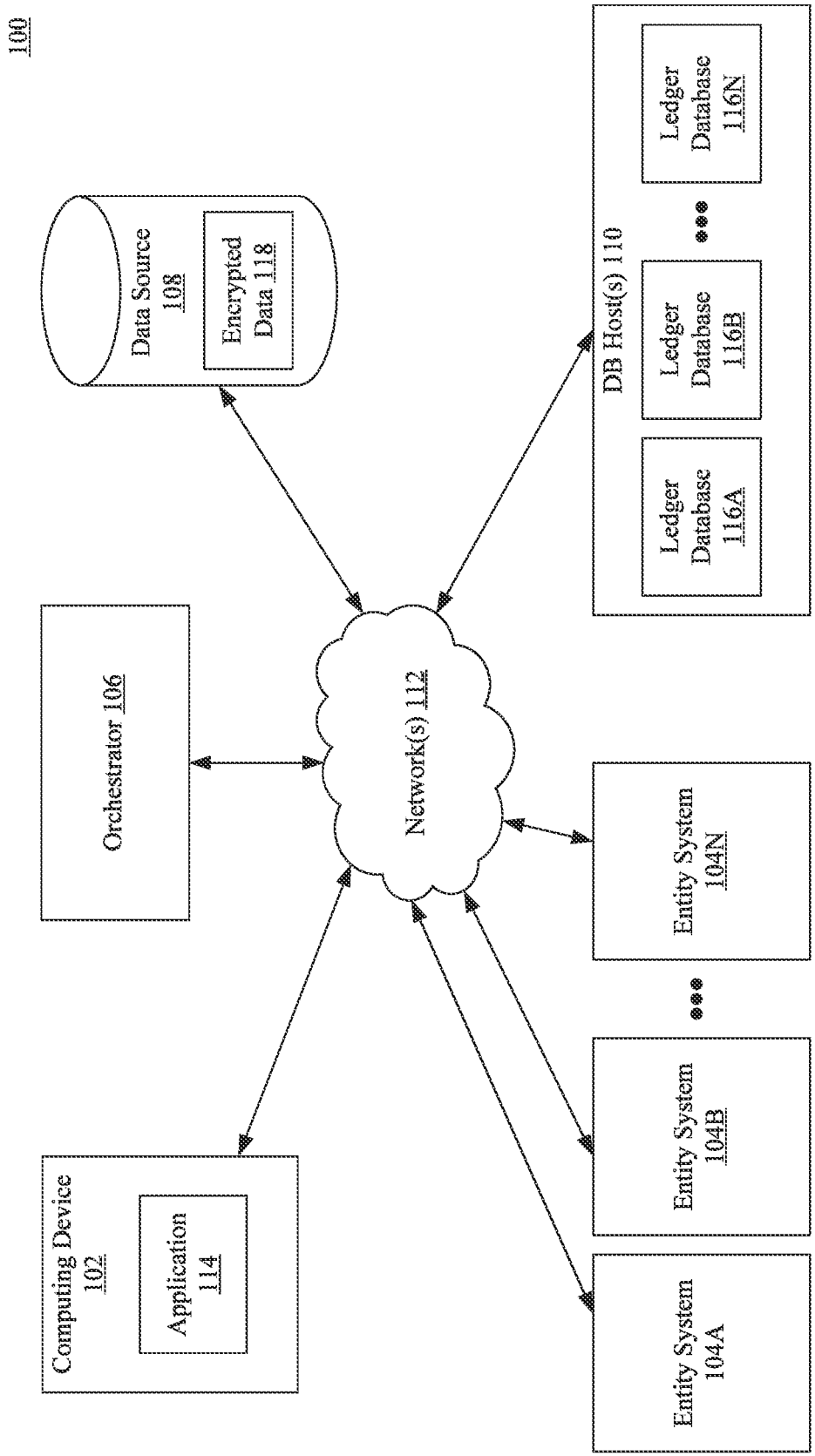
FIG. 1 shows a block diagram of an example system for providing access to data protected by a security policy in accordance with an example embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

As set forth in the Background section, public-key cryptography (also known as asymmetric cryptography) is a cryptographic system that uses pairs of keys. Each pair consists of a public key (which is known to others) and a private key (which is only known to the owner). Effective security requires keeping the private key private, whereas the public key can be openly distributed.

However, in some scenarios, a third party entity may request information protected by a user's private key. For instance, suppose a law enforcement agency seeks to enforce a blind subpoena to access data encrypted with Dan's private key and stored by a cloud service provider. In this scenario, the law enforcement agency wants to access the encrypted data without contacting Dan. However, Dan's employer wants the law enforcement agency to contact them in order to access Dan's encrypted data. Furthermore, Dan does not want his employer to be able to regularly access his encrypted data. In order to prevent unauthorized access to his encrypted data while enabling a blind subpoena to be enforced without his knowledge, Dan specifies a security policy that enables his employer or the law enforcement agency to access his encrypted data if the employer, the law enforcement agency, and a court request that Dan's employer or the law enforcement agency be provided access to Dan's encrypted data. For example, as described further below, Dan may generate a plurality of respective policy key shares to distribute to his employer, the law enforcement agency, and the court. These key shares correspond to a private key used to decrypt Dan's data, and when combined, cause a system to release the private key to the employer, law enforcement agency, and/or court, or otherwise provide access to Dan's encrypted data to the employer, law enforcement agency, and/or court without contacting Dan.

Moreover, as will be described further below, in accordance with one or more embodiments, systems and/or methods described herein enable the generation of a policy proof A policy proof is a cryptographic proof that enables any entity (e.g., Dan, the employer, the law enforcement agency, the court, etc.) to cryptographically verify that the key shares provided by Dan result in releasing Dan's private key when provided to a verifier. In this context, any entity is able to verify that the key shares generated by Dan satisfy an access policy that enables a blind subpoena to be enforced without his knowledge, without revealing the key shares themselves.

Embodiments described herein are directed to providing access to data protected by a security policy via a zero-trust distributed architecture. For example, a respective digital access request is received from each of a plurality of entities (e.g., Dan's employer, the law enforcement agency, and the court). Each digital access request includes a respective proof. For each digital access request, a respective encrypted secret share is obtained from a respective first ledger database. As used herein, the term "secret shares" refer to multiple items of information that, when combined, can be used to reconstruct a secret. In an embodiment, the secret shares are distributed to different entities, such that each entity receives only one of the secret shares and thus cannot by itself reconstruct the secret. In a further embodiment, when all of the entities present their respective secret shares to a verifier, the verifier will determine that a security policy has been satisfied and will grant access to data protected by the security policy to at least one of the entities. For instance, each of the digital access requests are validated based at least on the respective encrypted secret share and the respective proof, without decrypting the respective encrypted secret share. In response to validating all of the digital access requests, verification is made that an access criteria of a security policy is met. In response to verifying that the access criteria of the security policy is met, at least one of the entities (e.g., the law enforcement agency) is provided with access to data (e.g., Dan's data) protected by the security policy.

The techniques described herein provide cryptographic enforcement, in a zero-trust model (and other models), end-to-end across various types of data, services, and organizations. In particular, one or more components (e.g., component(s) that perform policy verification, proof verification, and/or key recovery) may not be considered "trusted." Such untrusted components are not entrusted to store sensitive data, such as decryption keys, due to a risk of the sensitive data being compromised thereon. Instead, such component(s) simply maintain the necessary information to release such keys.

Accordingly, the techniques described herein advantageously provide improvements in other technologies, namely data encryption, security, and privacy. For instance, by utilizing a zero-trust model, access to sensitive data, such as decryption keys, is prevented. Consequently, the techniques described herein also prevent access to a user's network and computing entities (e.g., computing devices, virtual machines, etc.). By mitigating the access to such computing entities, the unnecessary expenditure of compute resources (e.g., central processing units (CPUs), storage devices, memory, power, etc.) associated with such entities is also mitigated. Accordingly, the embodiments described herein also improve the functioning of the computing entity on which such compute resources are utilized/maintained, as such compute resources are conserved as a result from preventing a malicious entity from utilizing such compute resources, e.g., for nefarious purposes.

Moreover, unauthorized access to personal and/or confidential information is prevented by associating encrypted secret shares with identities of respective identities, the encrypted secret shares corresponding to an encrypted decryption key. Consequently, the techniques described herein prevent an unauthorized entity or an entity associated with only one of multiple respective encrypted secret shares from accessing personal and/or confidential information protected by a security policy that utilizes encrypted secret shares without authorization from each entity that possesses each respective encrypted secret share. For instance, a security policy in accordance with an embodiment requires proof of three distinct secret shares corresponding to an encrypted decryption key to be provided before authorizing access to data protected by the security policy. A verifier verifies the respective proofs and if all of the proofs are verified and an access criteria of the security policy is met, at least one of the entities is provided access to the data protected by the security policy. Consequently, the techniques described herein also prevent access to network and computing entities (e.g., computing devices, virtual machines, etc.) accessible to users with a corresponding decryption key and/or data protected by the security policy. By mitigating the access to such computing entities, the unnecessary expenditure of compute resources (e.g., central processing units (CPUs), storage devices, memory, power, etc.) associated with such entities is also mitigated. Accordingly, the embodiments described herein also improve the functioning of the computing entity on which such compute resources are utilized/maintained, as such compute resources are conserved as a result from preventing a malicious entity from utilizing such compute resources, e.g., for nefarious purposes.

FIG. 1 shows a block diagram of an example system 100 for providing access to data protected by a security policy in accordance with an example embodiment. As shown in FIG. 1, system 100 includes a computing device 102, entity systems 104A-104N, an orchestrator 106, a data source 108, and one or more database (DB) host(s) 110 ("DB hosts 110" hereinafter). Computing device 102 is any type of processing device, including, but not limited to, a desktop computer, a server, a mobile or handheld device (e.g., a tablet, a personal data assistant (PDA), a smart phone, a laptop, etc.), an Internet-of-Things (IoT) device, etc. Entity systems 104A-104N are any types of computing systems, including, but not limited to, one or more computing devices, enterprise computing systems, networked computing systems, etc. Orchestrator 106 comprises one or more server computers or computing devices, which include one or more distributed or "cloud-based" servers, in embodiments. In embodiments, orchestrator 106 is associated with, or a part of, a cloud-based service platform and in some embodiments, orchestrator 106 comprises on-premises server(s) in addition to, or in lieu of, cloud-based servers. DB hosts 110 comprise one or more server computers or computing devices, which include one or more distributed or "cloud-based" servers, in embodiments. In embodiments, DB hosts 110 are associated with, or are a part of, a cloud-based service platform and in some embodiments, DB host 110 comprise one or more on-premise servers in addition to, or in lieu of, cloud-based server(s). DB hosts 110 are configured to host and execute any type of DB server application, such as but not limited to, Azure SQL Database™ from Microsoft Corporation of Redmond, WA. In embodiments, computing device 102, entity systems 104A-104N, orchestrator 106, data source 108, and/or DB hosts 110, are communicatively coupled via one or more networks 112, comprising one or more of local area networks (LANs), wide area networks (WANs), enterprise networks, the Internet, etc., and includes one or more of wired and/or wireless portions.

As shown in FIG. 1, DB hosts 110 execute ledger databases 116A-116N. Each of ledger databases 116A-116N provide tamper-evidence capabilities for database tables of the respective ledger database (referred to as ledger tables), where one can cryptographically attest to other parties, such as auditors or parties that the data maintained by the database has not been tampered with. Ledger databases 116A-116N protect data from any attacker or high privileged user, including database administrators, system administrators, and cloud administrators. As with a traditional ledger, historical data is preserved. If a row is updated in a ledger table, its previous value is maintained and protected in a history table. Each of ledger databases 116A-116N provide a chronicle of all changes made to the respective database over time. In accordance with an embodiment, historical data is maintained in a relational form to support queries (e.g., SQL queries) for auditing, forensics, and other purposes.

For each of ledger databases 116A-116N, any rows of the respective database that are modified by a transaction in the ledger table are cryptographically hashed (e.g., SHA-256 hashed) using a data structure, such as a Merkle tree, that creates a root hash representing all rows in the transaction. The transactions that the respective ledger databases process are then also hashed together through another Merkle tree data structure. The result is a root hash that forms a block. The block is then hashed through the root hash of the block, along with the root hash of the previous block as input to the hash function. That hashing forms a blockchain. The root hashes, also referred herein as database digests, contain the cryptographically hashed transactions and represent the state of the database at the time the digests were generated. In accordance with an embodiment, respective digests are periodically generated and stored outside the respective database in tamper-proof storage. Digests are later used to verify the integrity of the respective database by comparing the value of the hash in the respective digest against the calculated hashes in the respective database.

In accordance with an embodiment, materialized views of ledger tables are generated in fixed periodic intervals referred to as epochs. In accordance with an embodiment, each of ledger databases 116A-116N are also configured to provide forward integrity, which guarantees that given a materialized view of a ledger table at any time t, it is infeasible to tamper the ledger table in any subsequent epoch.

Each of ledger databases 116A-116N is configured to store and protect any type of data or information, including, but not limited to a verifiable identity map, a verifiable attribute map, and/or a verifiable policy map. Additional details with regards to verifiable identity maps and verifiable attribute maps will be discussed further below with respect to FIG. 2. Additional details with regards to verifiable policy maps will be discussed further below with respect to FIG. 10. Each of ledger databases 116A-116N are configured to provide users (e.g., users of computing device 102 and/or entity systems 104A-104N) access to respective digests, which are representative of the state of the respective ledger database. Computing devices and/or systems may store the digests, as described further below with respect to FIGS. 2 and 10. It is noted that in embodiments, ledger databases 116A-116N are configured to provide access to some or all of the respective digests that are generated by the respective ledger database over time.

Computing device 102 is associated with a user and comprises an application 114. Application 114 is any software application that is utilized to access data (e.g., data maintained by data source 108), encrypt data (e.g., to generate encrypted data 118), generate secret shares, encrypt secret shares, access ledger databases (e.g., ledger databases 116A-116N), and/or interface with orchestrator 106. Examples of application 114 include, but are not limited to, a messaging application (e.g., Microsoft Teams™ published by Microsoft Corporation of Redmond, WA), a word processing application (e.g., Microsoft Word™ published by Microsoft Corporation), a database application, etc.

As stated above, application 114 is configured to access data on behalf of a user. For example, application 114 accesses encrypted data 118 maintained by data source 108. Data source 108 also comprises a policy ID specified for data maintained thereby. In accordance with an embodiment, the policy ID is stored as metadata associated with the data. Examples of data source 108 include, but are not limited to, a data store, a file repository, a database, etc. Examples of data maintained by data source 108 include, but are not limited to, a data file (e.g., a document), a database object (e.g., a table, a directory, etc.), structured data, unstructured data, semi-structured data, a data container, a decryption key, etc. The data may be encrypted (e.g., the data is encoded in accordance with an encryption technique, such as, but not limited to, the Advanced Encryption Standard (AES)). In such a case, application 114 requires the data to be decrypted (e.g., decoded in accordance with a decryption technique, such as, but not limited to, the AES), for example, using a decryption key in order to access it. The data is decrypted if a policy (e.g., an access policy) associated with the data is satisfied.

Each of entity systems 104A-104N correspond to a respective entity. For instance, as shown in FIG. 1, entity system 104A corresponds to Entity A, entity system 104B corresponds to Entity B, and entity system 104N corresponds to Entity B. Examples of entities include, but are not limited to, individual users, groups of users, and organizations. Examples of organizations include, but are not limited to, enterprises, non-profit companies, non-profit groups, governmental institutions, governmental bodies, and governmental agencies. For example, in a non-limiting example, Entity A is an enterprise, Entity B is a law enforcement agency, and Entity N is a court. In accordance with an embodiment, the user associated with computing device 102 is associated with an entity (e.g., as a member of the entity, an employee of the entity, a volunteer of the entity, an owner of the entity, a subscriber to a service of the entity, etc.). For example, in the non-limiting example, the user associated with computing device 102 is an employee of Entity A. In this context, computing device 102 may be a computing device within the entity system of the entity (e.g., entity system 104A) or another computing device associated with the user (e.g., a personal computing device).

Orchestrator 106 is configured to facilitate a determination as to whether the policy for data attempted to be accessed by application 114, stored in data source 108 on behalf of a user associated with computing device 102, and/or accessed by one of entities associated with entity systems 104A-104N (or applications and/or members associated with those entities) is satisfied. For example, in accordance with an embodiment, orchestrator 106 facilities the determination as to whether secret shares provided by the user associated with computing device 102 correspond to a decryption key that is used to decrypt data protected by a security policy. Upon determining that the secret shares do correspond to the decryption key, orchestrator 104 (or another component on behalf of orchestrator 104) stores the data protected by the security policy in data source 108 (e.g., as encrypted data 118). Additional details regarding storing data protected by a security policy are described below with respect to FIGS. 2 and 3.

In accordance with another embodiment, orchestrator 106 facilities the determination as to whether a plurality of entities (e.g., entities associated with any of entity systems 104A-104N) have the necessary secret shares specified by a security policy. Upon determining access criteria of the policy is met, orchestrator 106 obtains (or recovers) the decryption key and/or provides the decryption key to at least one of the plurality of entities. Alternatively, orchestrator 106 (or another component coupled thereto) decrypts the data using the decryption key, and the decrypted data is provided to the at least one of the plurality of entities. Additional details regarding determining as to whether a plurality of entities have the necessary secret shares specified by a policy are described below with respect to FIGS. 4-6, 11, and 10.

In accordance with another embodiment, orchestrator 106 facilities the determination of whether a proof held by an entity corresponds to a security policy. Upon determining that the proof held by the entity corresponds to the policy, orchestrator 106 notifies the entity (e.g., via a short messaging service (SMS) message, a telephone call, an e-mail, a notification that is presented via an application associated with the entity, etc.) that the proof corresponds to the policy. Additional details regarding validating a proof corresponding to a security policy are described below with respect to FIGS. 7 and 10.

III. Example Embodiments for Securely Storing Data

Figure 2:
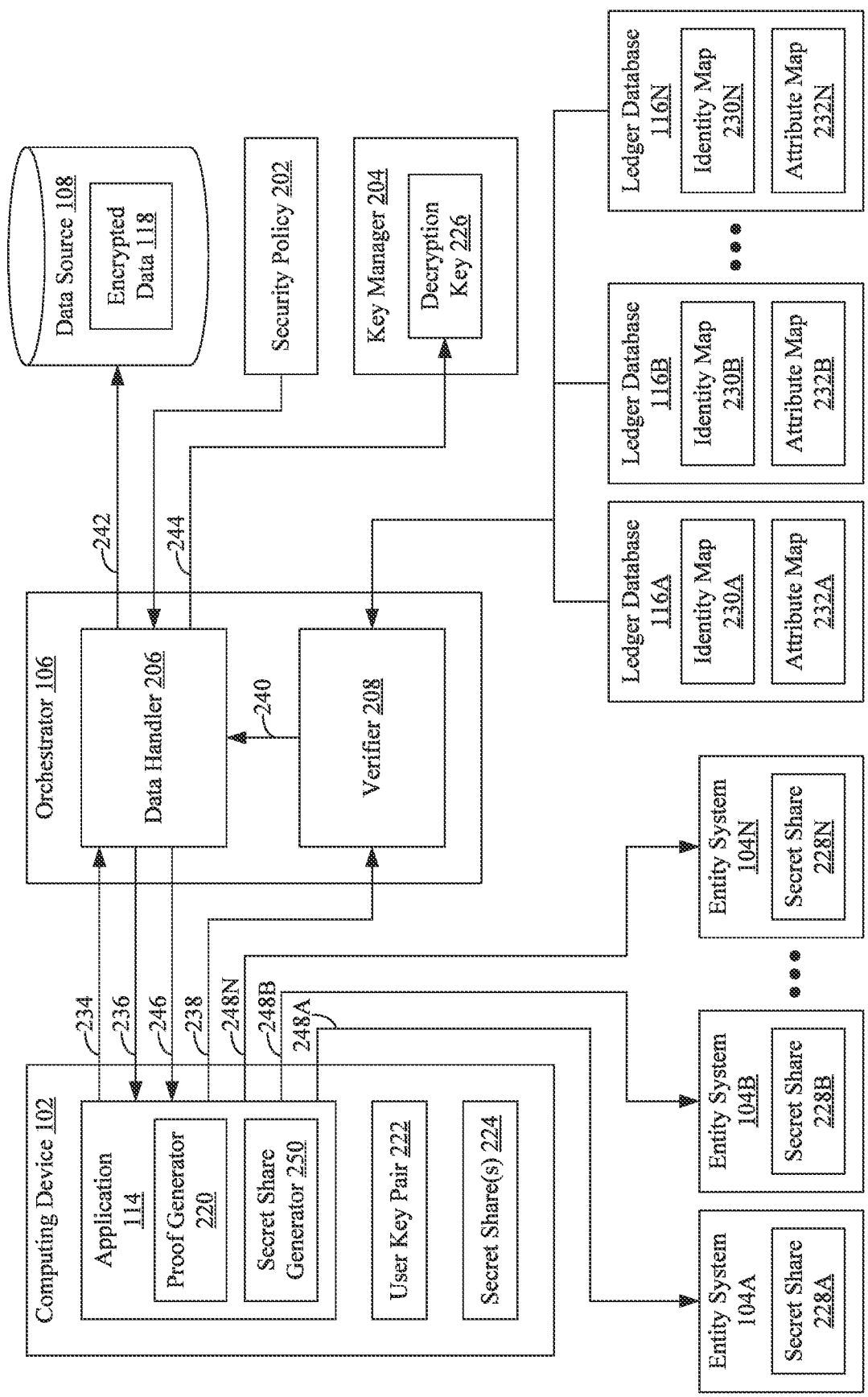
FIG. 2 shows a block diagram of a system for storing data protected by a security policy in accordance with an example embodiment.

As discussed above, systems, computing devices, and computer storage mediums described herein may store data protected by a security policy in various ways, in embodiments. For example, FIG. 2 shows a block diagram of a system 200 for storing data protected by a security policy in accordance with an example embodiment. As shown in FIG. 2, system 200 comprises computing device 102, entity systems 104A-104N, orchestrator 106, data source 108, and ledger database 116A-116N, as described above with reference to FIG. 1, a security policy 202, which includes one or more policies for data maintained by data source 108, and a key manager 204, which stores one or more decryption keys (e.g., decryption key 226). In accordance with another embodiment, key manager 204 comprises server computer (s) or computing device(s), which may include one or more distributed or "cloud-based" servers. In embodiments, key manager 204 comprises on-premises server(s) in addition to, or in lieu of, cloud-based servers. In accordance with an embodiment, key manager 204 is a trusted key manager. In accordance with another embodiment, key manager 204 is an untrusted key manager. Ledger databases 116A-116N each comprise respective identity maps 230A-230N and respective attribute maps 232A-232N. As also shown in FIG. 2, computing device 102 comprises application 114, as described with respect to FIG. 1, a user key pair 222, and secret share(s) 224. Application 114 executes a proof generator 220 and a secret share generator 250. As also shown in FIG. 2, orchestrator 106 comprises a data handler 206 and a verifier 208. In accordance with an embodiment, key manager 204 is included as part of orchestrator 106. As shown in FIG. 2, data handler 206 and verifier 208 are incorporated in orchestrator 106. In accordance with another embodiment, data handler 206 and/or verifier 208 are separate components (e.g., software applications) from orchestrator 106. In accordance with an embodiment data handler 206 and verifier 208 are integrated (e.g., as a single software application). In accordance with an embodiment, data handler 206 is a trusted data handler. In accordance with another embodiment, data handler 206 is an untrusted data handler. In accordance with an embodiment, verifier 208 is a trusted verifier. In accordance with another embodiment, verifier 208 is an untrusted verifier. In accordance with an embodiment, verifier 208 is incorporated in a location attribute policy (LAP) server coupled to orchestrator 106, not shown in FIG. 2 for brevity.

Figure 3:
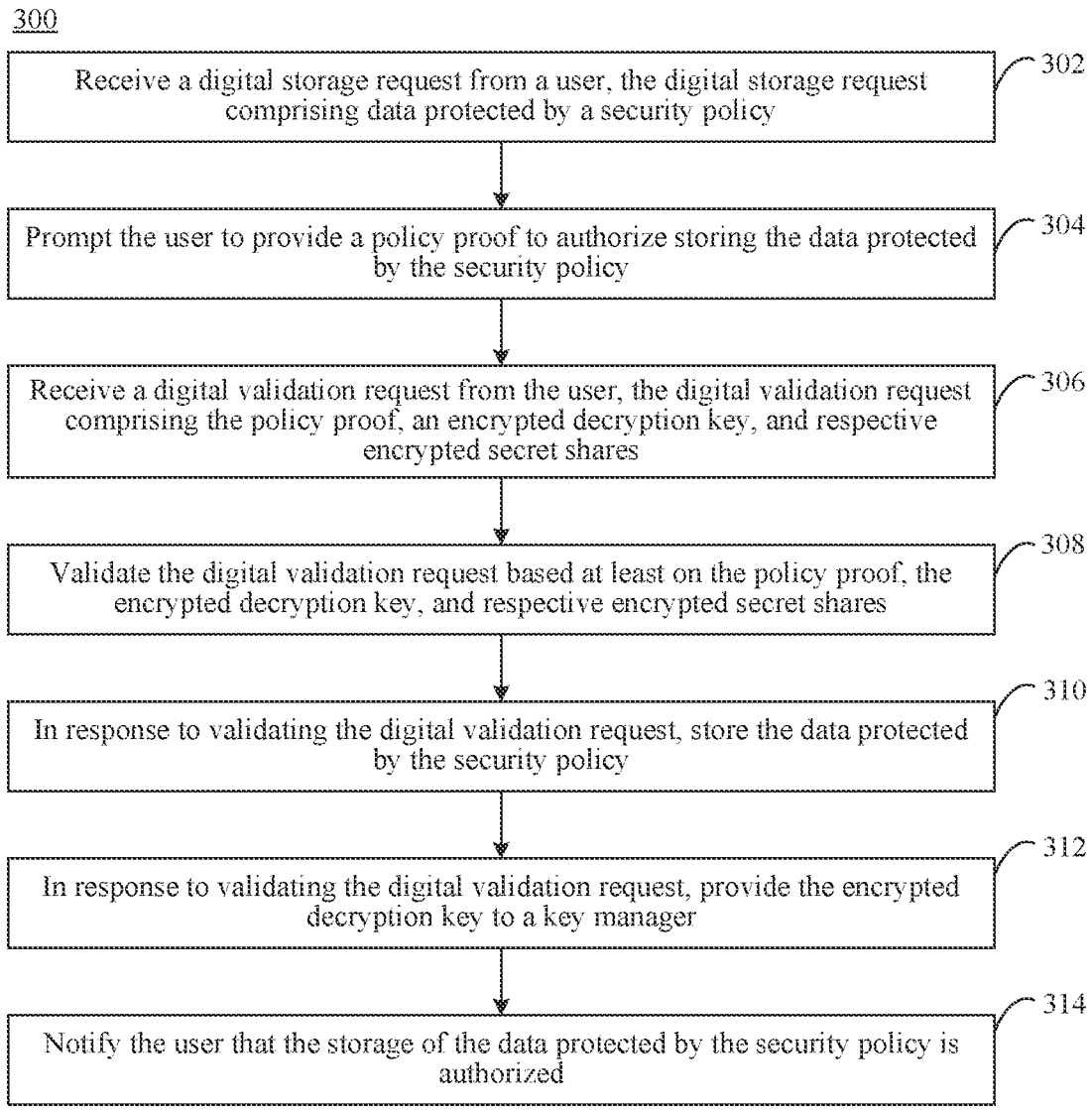
FIG. 3 shows a flowchart of a process for storing data protected by a security policy in accordance with an example embodiment.

For illustrative purposes, system 200 is described below with respect to FIG. 3. FIG. 3 shows a flowchart 300 of a process for storing data protected by a security policy in accordance with an example embodiment. System 200 may operate according to flowchart 300 in embodiments. Not all steps of flowchart 300 need be performed in all embodiments. Further structural and operational embodiments will be apparent to persons skilled in the relevant art(s) based on the following descriptions of FIGS. 2 and 3.

Flowchart 300 starts with step 302. In step 302, a digital storage request is received from a user. The digital storage request comprises data protected by a security policy. For example, data handler 206 receives digital storage request 234 from application 114 on behalf of a user, as shown in FIG. 2. Digital storage request 234 comprises data protected by security policy 202. As a non-limiting running example, data handler 206 receives digital storage request 234 from application 114 on behalf of Dan. In this context, digital storage request 234 comprises data that Dan wants to store and protect under security policy 202 (e.g., a security policy set by Dan's employer).

In step 304, the user is prompted to provide a policy proof to authorize storing the data protected by the security policy. For example, data handler 206 transmits a user prompt 236 to application 114 to prompt the user to provide a policy proof (e.g., via application 114) to authorize storing the data protected by security policy 202, as shown in FIG. 2. Data handler 206 may determine to transmit user prompt 236 in various ways. For example, data handler 206 in accordance with an embodiment, accesses security policy 202, analyzes security policy 202 to determine that security policy 202 includes a secret share policy (e.g., a key share policy). For instance, security policy 202 in accordance with an embodiment requires the user to validate secret shares (shown as secret share(s) 224 in FIG. 2) that correspond to a decryption key that may be used to decrypt the data protected by security policy 202. In this context, data handler 206 transmits user prompt 236 to prompt the user to prove that the user has generated secret shares 224 that correspond to a decryption key that may be used to decrypt the data protected by security policy 202. For instance, in the running example described above, data handler 206 determines that security policy 202 is a secret share policy that requires Dan to validate secret shares 224 that correspond to a decryption key used to encrypt Dan's data. In this context, security policy 202 is a security policy that requires Dan to enable certain entities to have access to either the decryption key or the encrypted data when the certain entities provide proof of possession of respective secret shares. In this running example, the certain entities include the legal team of Dan's employer ("Costly Co legal" herein), a law enforcement agency, and a court. In this running example, Costly Co legal is associated with entity system 104A, the law enforcement agency is associated with entity system 104B, and the court is associated with entity system 104N.

Secret shares may be generated in various ways. In accordance with an embodiment, the user (e.g., Dan) manually generates secret shares 224 based at least on decryption key 226 via secret share generator 250 of application 114. Alternatively, secret share generator 250 of application 114 automatically generates secret shares 224 based at least on the decryption key. For example, in accordance with an embodiment, secret share generator 250 generates multiple key shares from decryption key 226 by generating (e.g., randomly, pseudo-randomly, etc.) multiple numbers that, when used in a mathematical formula (e.g., multiplication), generate decryption key 226. In accordance with an embodiment, secret share generator 250 generates a secret share of secret shares 224 for each of entities of entity systems 104A-104N (e.g., Costly Co legal, the law enforcement agency, and the court). As shown in FIG. 2, secret share generator 250 is incorporated in application 114. In accordance with an alternative embodiment, secret share generator 250 is a separate component (e.g., a software application, a hardware-based secret share generator, etc.) from application 114.

As mentioned above, user prompt 236 prompts a user (or an application on behalf of the user) to provide a policy proof to authorize storing of data protected by a security policy. For example, proof generator 220 is configured to generate a zero-knowledge cryptographic proof based at least on a decryption key and unencrypted versions of secret shares that correspond to the decryption key (shown as secret share(s) 224 in FIG. 2). For instance, with respect to the running example, proof generator 220 generates a zero-knowledge cryptographic proof on behalf of Dan based at least on Dan's decryption key and the unencrypted versions of the secret shares generated by secret share generator 250 on behalf of Dan. In accordance with an embodiment, proof generator 220 is incorporated in application 114 (as shown in FIG. 2). In accordance with another embodiment, proof generator 220 is a separate component (e.g., a software application, a hardware-based proof generator, etc.) from application 114.

In accordance with an embodiment, and with reference to the running example, proof generator 220 of FIG. 2 is configured to generate the zero-knowledge cryptographic policy proof based at least on the decryption key, the unencrypted versions of secret shares, and public keys of entities associated with the unencrypted versions of secret shares. For instance, in the running example, proof generator 220 generates a (zero-knowledge) cryptographic policy proof based on Dan's decryption key, the unencrypted secret shares, and the public keys of Costly Co legal, the law enforcement agency, and the court. In accordance with an embodiment, proof generator 220 retrieves the public keys from respective identity maps 230A-230N, as discussed elsewhere herein. In accordance with an embodiment, proof generator 220 generates the cryptographic policy proof based on a zero-knowledge protocol, such as, but not limited to, Schnorr's protocol. In examples, while proof generator 220 generates a value using the unencrypted secret shares (which are deemed private), the generated value does not include the shared secrets. In other words, the generated value of the cryptographic policy proof cannot be used to reconstruct any secret share of the secret shares. In this manner, proof generator 220 provides a policy proof that when the secret shares are presented to a verifier, access to Dan's encrypted data will be provided to at least one of Costly Co legal, the law enforcement agency, and/or the court, as described elsewhere herein, despite not relaying any of the secret shares.

In various embodiments, the (zero-knowledge) policy proof comprises information that is used to prove that the secret shares generated by Dan correspond to the encryption key used to encrypt the data to be stored, and that if each of the secret shares is inputted into a mathematical formula, Dan's decryption key is generated. In accordance with an embodiment, a known encryption algorithm is used to generate the policy proof. In various other embodiments, other algorithms are used, such as a secure hash algorithm (SHA) instead of an encryption algorithm. For instance, the zero knowledge proof in such a case would be used to prove that if the secret shares were inputted into a SHA, the decryption key would be obtained. Other techniques are also contemplated herein, and disclosed techniques for providing a zero-knowledge proof are not limited to these illustrative examples.

In step 306, a digital validation request is received from the user. The digital validation request comprises the policy proof, an encrypted decryption key of the user, and respective encrypted secret shares. For example, verifier 208 receives a digital validation request 238 from application 114 on behalf of the user, as shown in FIG. 2. Digital validation request 238 comprises the (zero knowledge cryptographic) policy proof generated using proof generator 220, an encrypted decryption key of the user, and respective encrypted secret shares generated using secret share generator 250, as described above. For instance, in the running example, digital validation request 238 comprises the policy proof associated generated using proof generator 220, an encrypted version of Dan's key, and encrypted versions of the secret shares generated (e.g., by Dan or on behalf of Dan), as described above. In accordance with an embodiment, proof generator 220, the encrypted decryption key of the user, and the respective encrypted secret shares are included in separate requests received from application 114. As described herein, digital validation request 238 in accordance with an embodiment is a request. However, it is also contemplated herein that application 114 may generate digital validation request 238 automatically, semi-automatically, or manually (e.g., via a user interacting with application 114) as a digital validation response (e.g., in response to user prompt 236).

In step 308, the digital validation request is validated based at least on the policy proof, the encrypted decryption key, and respective encrypted secret shares. For example, verifier 208 of orchestrator 106 of FIG. 2 determines if the policy proof received in step 306 corresponds to the encrypted decryption key and the respective encrypted secret shares received in step 306. In accordance with an embodiment, verifier 208 is a proof verifier that verifies the (cryptographic) policy proof received via digital validation request 238 based at least on the encrypted decryption key and respective secret shares received via digital validation request 238. In accordance with another embodiment, verifier 208 is a proof verifier that verifies the (cryptographic) policy proof received via digital validation request 238 based at least on the encrypted decryption key and respective encrypted secret shares received via digital validation request 238 and public keys of respective entities. In this context, verifier 208 retrieves the public keys from respective identity maps 230A-230N. For instance, in the running example, verifier 208 retrieves public keys of Costly Co legal, the law enforcement agency, and the court from respective identity maps 230A-230N and uses the retrieved public keys, the encrypted version of Dan's keys, and encrypted versions of the secret shares to verify the policy proof generated by, or behalf of, Dan. In accordance with an embodiment, verifier 208 verifies the (cryptographic) policy proof based on a zero-knowledge protocol, such as, but not limited to, Schnorr's protocol. In one implementation, validation of the policy proof is performed by comparing a first value generated by verifier 208 that is determined from the encrypted decryption key and respective encrypted secret shares with a second value that is based on a stored version of the policy proof that is accessible to verifier 208 (e.g., stored in data source 108 or a policy map of a ledger database). In response to determining that the (cryptographic) policy proof is verified, verifier 208 validates digital validation request 238 and transmits a validation notification 240 to data handler 206, as shown in FIG. 2, and flowchart 300 proceeds to step 310.

In response to determining that the (cryptographic) policy proof does is not verified, verifier 208 of FIG. 2 does not validate the digital validation request and data handler 206 does not store the data protected by security policy 202. In accordance with an embodiment, in response to not validating the digital validation request, verifier 208, data handler 206, and/or another component of orchestrator 106 transmit a notification (not shown in FIG. 2) to application 114 or the user (e.g., Dan) indicating that the data protected by security policy 202 was not stored.

In step 310, in response to validating the digital validation request, the data protected by the security policy is stored. For example, data handler 206 transmits a storage signal 242 to data source 108 for storing the data protected by security policy 202 therein, as shown in FIG. 2. Storage signal 242 comprises the data protected by security policy 202. In accordance with an embodiment, storage signal 242 also includes the policy proof and data source 108 stores the policy proof with the data. For instance, in the running example, data source 108 stores Dan's protected data and the policy proof associated with his protected data as encrypted data 118. Alternatively, data handler 206 associates the policy proof with security policy 202. For example, data handler 206 in accordance with an embodiment associates the policy proof with security policy 202 in a policy map. Additional details regarding policy maps are described further below with respect to FIG. 10.

In step 312, in response to validating the digital validation request, the encrypted decryption key is provided to a key manager. For example, data handler 206 provides the encrypted decryption key to key manager 204 via key store request 244, as shown in FIG. 2. Key manager 204 stores the encrypted decryption key (e.g., an encrypted version of Dan's key) included in key store request 244 as decryption key 226. In accordance with an embodiment, key manager 204 includes a data identifier with decryption key 226 that uniquely identifies the data associated with decryption key 226 (e.g., encrypted data 218).

In step 314, the user is notified that the storage of the data protected by the security policy is authorized. For example, data handler 206 transmits a successful storage notification 246 to application 114, as shown in FIG. 2. Examples of successful notification 246 include, but are not limited to, a short messaging service (SMS) message, a telephone call, an e-mail, a notification that is presented via application 114 and/or another application executing on computing device 102 and/or another computing device associated with the user, etc. Alternatively, data handler 206 transmits notification 246 to another computing device (e.g., a personal computing device) associated with the user (e.g., Dan).

In response to receiving notification 246, application 114 distributes respective secret shares of secret shares 224 to entity systems 104A-104N. As discussed above, in accordance with an embodiment, application 114 encrypts each secret share with a respective public key of the corresponding entity associated with respective entity systems 104A-104N. As shown in FIG. 2, application 114 distributes respective secret shares of secret shares 224 to entity systems 104A-104N by transmitting respective secret share signals 248A-248N to respective entity systems 104A-104N. In accordance with an embodiment, each respective secret share signal of secret share signals 248A-248N are messages that comprise a respective encrypted secret share encrypted with a respective entity's public key and the policy proof. For instance, in the running example, secret share signal 248A comprises the first encrypted secret share encrypted with Costly Co legal's public key and the policy proof, secret share signal 248B comprises the second encrypted secret share encrypted with the law enforcement agency's public key and the policy proof, and secret share signal 248N comprises the third encrypted secret share encrypted with the court's public key and the policy proof By providing each of entity systems 104A-104N with the policy proof, each entity (e.g., Costly Co legal, the law enforcement agency, the court) is able to verify that the secret shares distributed to entity systems 104A-104N correspond to the encrypted decryption key that decrypts the data protected by security policy 202. Additional details regarding verifying the policy proof will be described further below with respect to FIGS. 7 and 8.

Each of entity systems 104A-104N stores respective secret shares on-premises (e.g., shown as secret shares 228A-228N in FIG. 2) and/or in an external data source accessible by the respective entity system. In accordance with an embodiment, each of entity systems 104A-104N stores encrypted versions of secret shares 228A-228N in respective attribute maps 232A-232N. In accordance with an embodiment, encrypted versions of secret shares 228A-228N are encrypted with respective public keys of entities associated with entity systems 104A-104N. For instance, in the running example, Costly Co legal's secret share 328A is encrypted with Costly Co legal's public key, the law enforcement agency's secret share 328B is encrypted with the law enforcement agency's public key, and the court's secret share 328N is encrypted with the court's public key. Additional details regarding identity maps 230A-230N and attribute maps 232A-232N are described below.

Identity maps 230A-230N are configured to store identities for each of a plurality of users (e.g., members, employees, etc.), for example, associated with an entity. Each identity comprises information that uniquely identifies the user associated with the entity. Examples of the identity include, but are not limited to, the user's e-mail address, the user's phone number, the user's username, or any other type of information that uniquely identifies the user. Identity maps 230A-230N are also configured to store, for each user, a public key of the user in association with the identity of the user.

Attribute maps 232A-232N are configured to store one or more attributes for each of a plurality of users associated with the entity. Each of the attribute(s) for a particular user are stored in association with the identity of that user. For instance, attribute maps 232A-232N are configured to store, for each user, one or more encrypted secret shares (e.g., one or more pieces of data, such as a password, a private key, a public key, a string of characters and/or random numbers, etc. that are encoded in accordance with an encryption technique, such as, but not limited to, a secure hash algorithm (SHA)-based technique). Each of the secret share(s) for a particular user are stored in association with the identity of that user. Attribute maps 232A-232N also associate each encrypted secret share with a corresponding attribute of the attributes stored in respective attribute maps 232A-232N. As described below, the encrypted secret share(s) are utilized to verify whether a user is actually associated with corresponding attributes. In accordance with an embodiment, the secret share(s) of a user stored in attribute maps 232A-232N are encrypted with a private key of that user. In accordance with an embodiment, attribute maps 232A-232N are also configured to store, for each attribute, a public key, which, as will be described below, is utilized to generate and verify cryptographic proofs. In this context, attribute maps 232A-232N associate each public key with a corresponding attribute and corresponding encrypted secret share of the attributes stored in respective attribute maps 232A-232N.

Identity maps 230A-230N and attribute maps 232A-232N may be generated and/or maintained by respective entities in accordance with any technique known for generating and or maintaining maps within a ledger database. While FIG. 2 depicts ledger databases 116A-116N each storing a respective identity map of identity maps 230A-230N and a respective attribute map of attribute maps 232A-232N, in accordance with an alternative embodiment separate ledger databases are used to store respective identity maps and/or attribute maps. An example of a database via which respective identity maps of identity maps 230A-230N and/or respective attribute maps of attribute maps 232A-232N are maintained includes, but is not limited to, Azure SQL Database™ from Microsoft® Corporation of Redmond, Washington.

IV. Example Embodiments for Providing Access to Data

Figure 4:
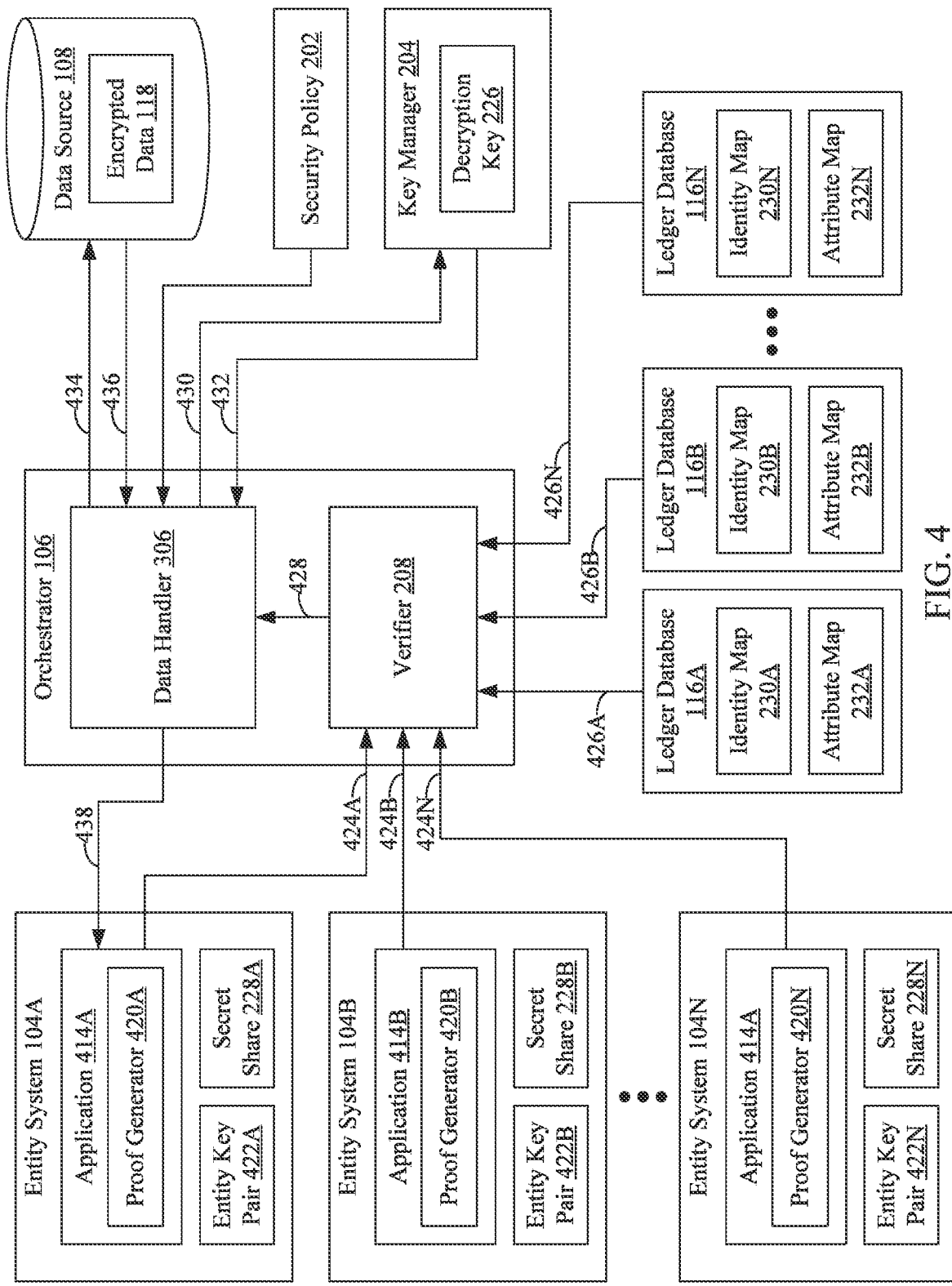
FIG. 4 shows a block diagram of a system for providing access to data protected by a security policy in accordance with an embodiment.

As described herein, embodiments provide at least one entity of a plurality of entities access to data protected by a security policy. Systems, methods, and computer-readable storage medium having program instructions recorded thereon may provide access to data protected by a security policy in various ways, in embodiments. For example, FIG. 4 shows a block diagram of a system 400 for providing access to data protected by a security policy in accordance with an embodiment. As shown in FIG. 4, system 400 includes entity systems 104A-104N (which store respective secret shares 228A-228N), orchestrator 106 (comprising data handler 206 and verifier 208), data source 108 (maintaining encrypted data 118), ledger databases 116A-116N (comprising respective identity maps 230A-230N and respective attribute maps 232A-232N), security policy 202, and key manager 204 (which stores one or more decryption keys, e.g., decryption key 226), as described above with respect to FIG. 2. As also shown in FIG. 4, each of entity systems 104A-104N comprise respective applications 414A-414N and respective entity key pairs 422A-422N. Each of applications 414A-414N is any software application that is utilized to access data (e.g., data maintained by data source 108), encrypt secret shares, access ledger databases (e.g., ledger databases 116A-116N), decrypt data, and/or interface with orchestrator 106. Examples of applications 414A-414N include, but are not limited to, a messaging application (e.g., Microsoft Teams™ published by Microsoft Corporation of Redmond, WA), a word processing application (e.g., Microsoft Word™ published by Microsoft Corporation), a database application, etc. Each of applications 414A-414N execute a respective proof generator 420A-420N. Each of respective entity key pairs 422A-422N comprise a public key of the respective entity (which is known to others) and a private key of the respective entity (which is only known to the entity).

Figure 5A:
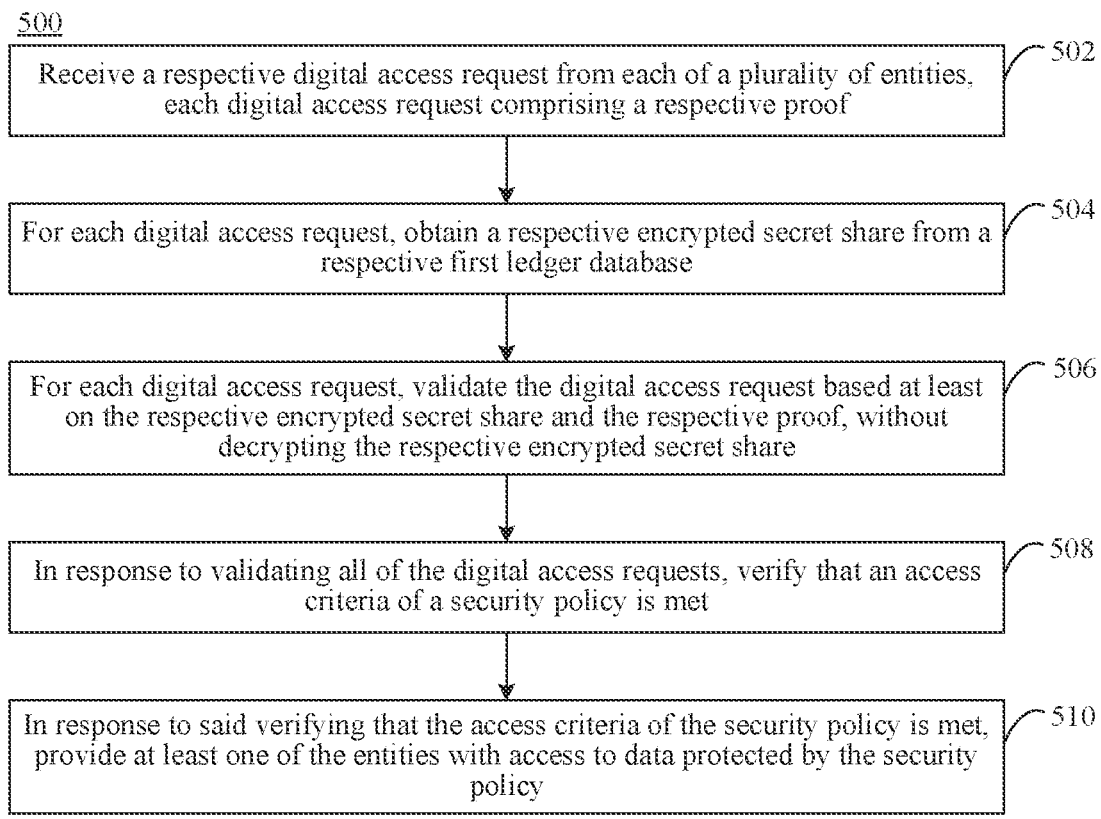
FIG. 5A shows a flowchart of a process for accessing data protected by a security policy in accordance with an embodiment.

For illustrative purposes, system 400 is described below with respect to FIG. 5A. FIG. 5A shows a flowchart 500 of a process for accessing data protected by a security policy in accordance with an embodiment. System 400 may operate according to flowchart 500 in embodiments. Not all steps of flowchart 500 need be performed in all embodiments. Further structural and operational embodiments will be apparent to persons skilled in the relevant art(s) based on the following descriptions of FIGS. 4 and 5A.

Flowchart 500 begins with step 502. In step 502, a respective digital access request is received from each of a plurality of entities. Each digital access request comprises a respective proof. For example, verifier 208 receives respective digital access requests 424A-424N from each of applications 414A-414N on behalf of respective entities, as shown in FIG. 4. Each of digital access requests 424A-424N comprises a respective proof generated by a respective proof generator 420A-420N. For instance, with respect to the running example described above with respect to FIGS. 2 and 3, verifier 208 receives digital access request 424A from application 414A on behalf of Costly Co legal, receives digital access request 424B from application 414B on behalf of the law enforcement agency, and receives digital access request 424N from application 414N on behalf of the court.

Figure 6:
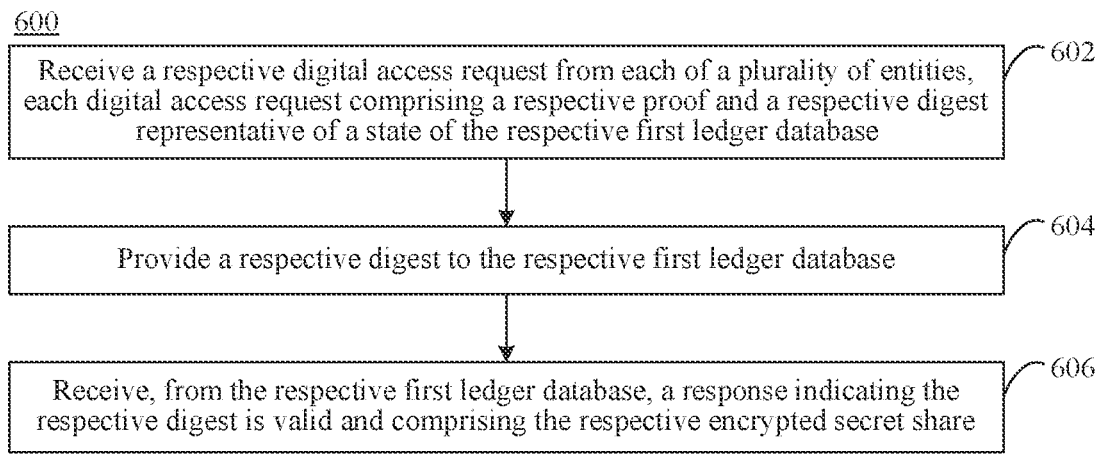
FIG. 6 shows a flowchart of a process for obtaining respective encrypted secret shares from respective ledger databases in accordance with an embodiment.

In accordance with an embodiment, and as will be described below with respect to FIG. 6, each of digital access requests 424A-424N comprises a respective digest representative of the state of a respective ledger database. In accordance with an embodiment, verifier 208, data handler 206, and/or another component of orchestrator 106 (e.g., a proof requestor, not shown in FIG. 4 for brevity) request applications 414A-414N to provide respective digital access requests 424A-424N (e.g., via prompting a user to provide a respective proof or via proof generators 420A-420N to generate the respective proof). For example, in accordance with an embodiment, verifier 208, data handler 206, and/or another component of orchestrator 106 receive an initial access request from at least one of applications 414A-414N (e.g., Costly Co legal, the law enforcement agency, and/or the court) requesting access to encrypted data 118 (e.g., Dan's data) on behalf of at least one respective entity (e.g., a "requesting entity"), access security policy 202 in response to the initial access request (e.g., based on a policy ID included in the initial access request), and analyze security policy 202 to determine the secret shares that are required to access encrypted data 118. In this context, verifier 208, data handler 206, and/or another component of orchestrator 106 transmits a request to each of applications 414A-414N to provide respective zero-knowledge cryptographic proofs that the respective entities have respective secret shares (e.g., secret shares 228A-228N) of the determined secret shares and authorize the requesting entity to access encrypted data 118.

Each of proof generators 420A-420N are associated with a respective application 414A-414N. In accordance with an embodiment, each of proof generators 420A-420N are incorporated in a respective application 414A-414N. In accordance with another embodiment, any of proof generators 420A-420N are separate components (e.g., software applications, hardware-based proof generators, etc.) from the respective application 414A-414N. Each of proof generators 420A-420N are configured to generate a zero-knowledge cryptographic proof based at least on an unencrypted version of a respective secret share (shown as secret shares 228A-228N in FIG. 4). As shown in FIG. 4, respective secret shares 228A-228N are stored locally by respective entity systems 104A-104N. As described above, encrypted version of respective secret shares 228A-228N are stored in respective maps maintained by respective ledger databases (e.g., attribute maps 232A-232N maintained by ledger databases 116A-116N).

In accordance with an embodiment, each of proof generators 420A-420N are configured to generate a zero-knowledge cryptographic proof based at least on the unencrypted version of the respective secret share, a respective public key (e.g., a public key of a respective entity key pair of entity key pairs 422A-422N or a public key associated with an encrypted version of the respective secret share (e.g., stored in attribute map 232A-232N, as described elsewhere herein)), and an encryption algorithm used to encrypt a set of data. In accordance with an embodiment, each of proof generators 420A-420N generates a respective cryptographic proof based on a zero-knowledge protocol, such as, but not limited to, Schnorr's protocol. In examples, while each of proof generators 420A-420N generate a value using respective secret shares 228A-228N (which are deemed private), the respective generated values do not include the respective secret shares 228A-228N. In other words, the respective generated values of the respective cryptographic proofs cannot be used to reconstruct any secret share of respective secret shares 228A-228N. In this manner, proof generators 420A-420N each provide a proof that proves that the respective entity (e.g., Costly Co legal, the law enforcement entity, and/or the court) possesses a given secret share, despite not relaying the secret share. Proof generators 420A-420N provide respective cryptographic proofs to verifier 208 (e.g., via respective digital access requests 424A-424N).

In various embodiments, and as will be discussed further herein, the zero-knowledge proof comprises information that is used to prove that the entity (e.g., Costly Co legal, the law enforcement agency, and/or the court) possesses the value of a secret share, and that if that secret share is inputted into a known encryption algorithm, then the value of an encrypted version of the secret share (e.g., stored in a respective attribute map of attribute maps 232A-232N) will be obtained. In various other embodiments, other algorithms are used, such as a secure hash algorithm (SHA) instead of an encryption algorithm. For instance, with respect to the running example, the zero knowledge proof in such a case would be used to prove that if secret share 228A associated with Costly Co legal is inputted into a SHA, the value stored in the attribute map 232A will be obtained (provided that the value in attribute map 232A is also based on this algorithm). Other techniques are also contemplated herein, and disclosed techniques for providing a zero-knowledge proof are not limited to these illustrative examples. In some further implementations, the zero-knowledge proof is not re-playable. For example, in some embodiments, verifier 208 generates a random number for each session (e.g., each new communication session in which entity systems 104A-104N seek access to encrypted data), and provides the randomly generated number to respective proof generators 420A-420N to be used as part of the proof generation process. Thus, even if the same proof was attempted to be used for a subsequent session (either by the same system or in a malicious fashion by a different system), the proof would not succeed because the subsequent session would have a different randomly generated number that is to be used as part of the proof generation process.

In step 504, for each digital access request, a respective encrypted secret share is obtained from a respective first ledger database. For example, verifier 208 obtains a respective encrypted secret share for each of digital access requests 424A-424N from respective attribute maps 232A-232N via signals 426A-426N. As will be discussed below with respect to FIG. 5B, signals 426A-426N in accordance with an embodiment also include respective public keys obtained from respective identity maps 230A-230N. In order to obtain the respective encrypted secret shares, verifier 208 determines which attribute map stores the respective encrypted secret share for each of digital access requests 424A-424N. For example, each of digital access requests 424A-424N in accordance with an embodiment includes an entity identifier (ID) that uniquely identifies the entity associated with the digital access request. Verifier 208 accesses the respective attribute map of attribute maps 232A-232N based on the respective entity IDs and obtains a respective encrypted secret share associated with the respective entity ID. For instance, in accordance with the running example, and as shown in FIG. 4, verifier 208 accesses attribute map 232A to obtain an encrypted version of secret share 228A associated with an entity ID of Costly Co legal included in digital access request 424A, accesses attribute map 232B to obtain an encrypted version of secret share 228B associated with an entity ID of the law enforcement agency included in digital access request 424B, and accesses attribute map 232N to obtain an encrypted version of secret share 228N associated with an entity ID of the court included in digital access request 424N. Additional details regarding obtaining encrypted secret shares from attribute maps are discussed below with respect to FIG. 6.

In step 506, for each digital access request, the digital access request is validated based at least on the respective encrypted secret share and the respective proof, without decrypting the respective encrypted secret share. For example, verifier 208 of FIG. 4 is configured to validate each of digital access requests 424A-424N based at least on the respective encrypted secret shares and respective proofs, without decrypting the respective encrypted secret shares. In accordance with an embodiment, verifier 208 determines if the respective proof provided in each of digital access requests 424A-424N corresponds to the respective encrypted secret shares. In accordance with an embodiment, verifier 208 is a proof verifier that determines if the respective proof provided in each of digital access requests 424A-424N corresponds to the respective encrypted secret shares based at least on two or more of the respective proof, the respective encrypted secret share of encrypted secret shares, and a public key corresponding to the respective encrypted secret share. In accordance with an embodiment, verifier 208 verifies the respective proof based on a zero-knowledge protocol, such as, but not limited to, Schnorr's protocol. In one implementation, validation of the respective proof is performed by comparing a first value generated by verifier 208 that is determined from the respective encrypted secret share obtained from the respective attribute map and the public key corresponding to the associated entity obtained from the respective identity map with a second value that is based on the proof received in respective digital access request 424A-424N. In response to determining that the respective proof corresponds to the respective encrypted secret share, verifier 208 validates the respective digital access request of digital access requests 424A-424N.

In response to determining that a respective proof does not correspond to the respective encrypted secret share, verifier 208 does not validate the respective digital access request 424A-424N. In accordance with an embodiment, in response to not validating one or more of respective digital access requests 424A-424N, verifier 208 invalidates all of digital access requests 424A-424N. In accordance with an embodiment, in response to not validating one or more of respective digital access requests 424A-424N, verifier 208 transmits a notification (not shown in FIG. 4) to a respective application 414A-414N or the respective entity (e.g., Costly Co legal, the law enforcement agency, or the court) associated with the respective application 414A-414N indicating that the respective digital access request 424A-424N was not validated. In accordance with an embodiment, verifier 208 transmits a notification to each respective application of applications 414A-414N that provided a respective digital access request of digital access requests 424A-424N if any one (or more) of digital access requests 424A-424N were not validated. In this context, such notification may indicate which digital access request(s) was not validated, an entity associated with the digital access request, the policy associated with the digital access request, and/or any other information associated with the digital access request.

In accordance with an embodiment, verifier 208 validates each of digital access request 424A-424N simultaneously or concurrently. In accordance with another embodiment, verifier 208 validates each of digital access requests 424A-424N sequentially. In accordance with another embodiment, verifier 208 includes multiply sub-verifiers (e.g., child applications) that verify a respective one or more of digital access requests 424A-424N. Additional details regarding validating digital access requests are described further below with respect to FIGS. 5B and 6.

In step 508, in response to validating all of the digital access requests, a verification is made that access criteria of a security policy is met. For example, in response to validating all of digital access requests 424A-424N, verifier 208 verifies that access criteria of security policy 202 is met. In accordance with an embodiment, verifier 208 analyzes security policy 202 in response to validating all of digital access requests 424A-424N to determine (e.g., verify) that access criteria of security policy 202 is met. For instance, in the running example, verifier 208 analyzes the security policy that Dan's data is protected by and determines that access criteria of the policy is met if the digital access requests from Costly Co legal, the law enforcement agency, and the court (or on behalf thereof) are all validated. In accordance with another embodiment, verifier 208 transmits validation notification 428 to data handler 206 to verify that access criteria of security policy 202 is met. In this context, validation notification 428 includes an indication of each digital access request of digital access requests 424A-424N that was validated. In this context, data handler 206 analyzes validation notification 428 and security policy 202 to verify that the access criteria of security policy 202 is met.

In step 510, in response to said verifying that the access criteria of the security policy is met, at least one of the entities is provided with access to data protected by the security policy. For example, in response to verifying that the access criteria of security policy 202 is met, orchestrator 106 of FIG. 4 provides access to at least one of the entities associated with entity systems 104A-104N with access to encrypted data 118 protected by security policy 202. For instance, in the running example described above, orchestrator 106 provides access to Dan's data to at least one of Costly Co legal, the law enforcement agency, and the court. Additional details regarding providing entities access to data protected by security policies is described further below with respect to FIGS. 5C and 5D below.

Figure 5B:
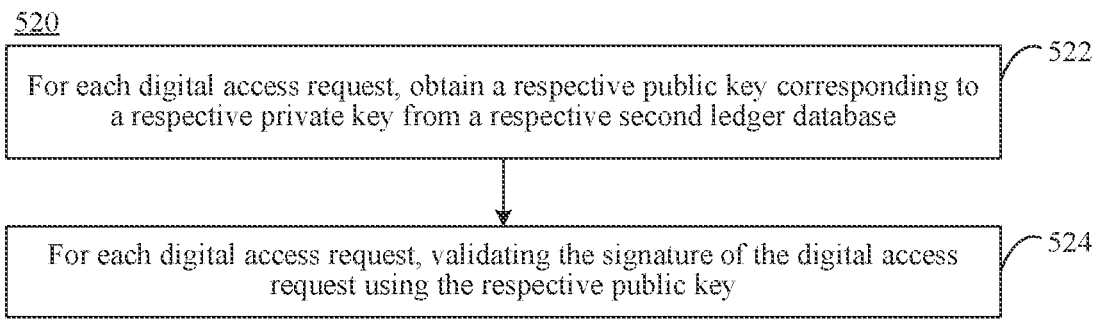
FIG. 5B shows a flowchart of a process for validating a digital access request in accordance with an embodiment.

Verifier 208, as described above with respect to FIG. 4, may operate in various ways to validate digital access requests, in embodiments. For instance, each of digital access requests 424A-424N is signed by a respective private key of a respective entity. For example, in accordance with an embodiment, digital access request 424A is signed by a private key of Entity A, digital access request 424B is signed by a private key of Entity B, and digital access request 424N is signed by a private key of Entity N. In this context, verifier 208 operates to validate each of digital access requests 424A-424N by validating signatures of digital access requests 424A-424N. For example, FIG. 5B shows a flowchart 520 of a process for validating a digital access request in accordance with an embodiment. Verifier 208 may operate according to flowchart 520 in embodiments. Not all steps of flowchart 520 need be performed in all embodiments. One or more steps of flowchart 520 may be a further embodiment of step 506 of flowchart 500 of FIG. 5A. Alternatively, one or more steps of flowchart 520 are performed prior to step 504 or step 506 of flowchart 500 of FIG. 5A. Further structural and operational embodiments will be apparent to persons skilled in the relevant art(s) based on the following description of FIG. 5B.

Flowchart 520 begins with step 522. In step 522, for each digital access request, a respective public key is obtained from a respective second ledger database. Each respective public key corresponds to a respective private key. For example, for each of digital access requests 424A-424N, verifier 208 obtains a respective public key from respective identity maps 230A-230N via signals 426A-426N. In accordance with another embodiment, for each of digital access requests 424A-424N, verifier obtains a respective public key from respective identity maps 230A-230N via signals separate from signals 426A-426N, not shown in FIG. 4. In order to obtain the respective public keys, verifier 208 determines which identity map stores the respective public key for each digital access request 424A-424N. For example, each of digital access requests 424A-424N in accordance with an embodiment includes a respective entity ID that uniquely identifies the respective entity associated with the respective digital access request. Verifier 208 access the respective identity map of identity maps 230A-230N based on the respective entity IDs and obtains the respective public key associated with the respective entity ID. For instance, in the running example described above with respect to FIGS. 2-5A, verifier 208 accesses identity map 230A to obtain a first respective public key associated with an entity ID of Costly Co legal included in digital access request 424A, accesses identity map 230B to obtain a second respective public key associated with an entity ID of the law enforcement agency included in digital access request 424B, and accesses identity map 230N to obtain a third respective public key associated with an entity ID of the court included in digital access request 424N. Public keys may be obtained from identity maps in a similar manner to that described with respect to obtaining encrypted secret shares from attribute maps, as discussed below with respect to FIG. 6.

In step 524, for each digital access request, the signature of the digital access request is validated using the respective public key. For example, verifier 208 validates the signatures of digital access requests 424A-424N using the respective public keys obtained in step 522. For instance, in the running example, verifier 208 validates the signatures of digital access requests 424A-424N using the public keys of Costly Co legal, the law enforcement agency, and the court. If all of the signatures of digital validation requests 424A-424N are validated, the flow in accordance with an embodiment proceeds to step 508 of flowchart 500 of FIG. 5A. In accordance with another embodiment, steps 522 and 524 are performed prior to step 504 of flowchart 500. In this context, if all of the signatures of digital validation requests 424A-424N are validated, the flow proceeds to step 504 of flowchart 500. In accordance with another embodiment, verifier 208 performs steps 522 and 524 of flowchart 520 and steps 504 and 506 of flowchart 500 sequentially for each of digital access requests 522-524.

In response to determining that a respective signature of a respective digital access request 424A-424N does not correspond to the respective public key, verifier 208 does not validate the respective signature. In accordance with an embodiment, in response to not validating one or more respective signatures of respective digital access requests 424A-424N, verifier 208 invalidates all of digital access requests 424A-424N. In accordance with an embodiment, in response to not validating one or more respective signatures, verifier 208 transmits a notification (not shown in FIG. 4) to a respective application 414A-414N or the respective entity (e.g., Costly Co legal, the law enforcement agency, or the court) associated with the respective application 414A-414N indicating that the respective signature and/or the respective digital access request 424A-424N was not validated. In accordance with an embodiment, verifier 208 transmits a notification to each respective application of applications 414A-414N that provided a respective digital access request of digital access requests 424A-424N if any one (or more) of the respective signatures were not validated, as described elsewhere herein.

Figure 5C:
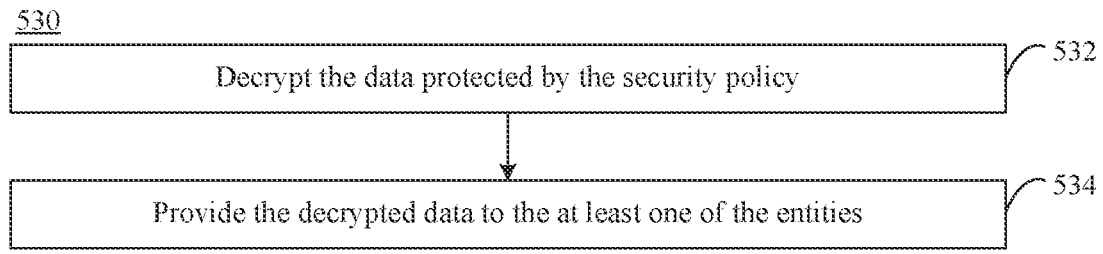
FIG. 5C shows a flowchart of a process for providing decrypted data to at least one entity in accordance with an embodiment.

System 400 of FIG. 4 may operate in various ways to provide at least one entity with access to data protected by a security policy. For instance, verifier 208, as described above with respect to FIG. 4, in accordance with one or more embodiments is trusted to decrypt data protected by a security policy and operates to provide at least one entity with access to data protected by security policy 202. For example, FIG. 5C shows a flowchart 530 of a process for providing decrypted data to at least one entity in accordance with an embodiment. Verifier 208 may operate according to flowchart 530 in embodiments. Not all steps of flowchart 530 need be performed in all embodiments. Flowchart 530 is a further embodiment of step 510 of flowchart 500 of FIG. 5A. Further structural and operational embodiments will be apparent to persons skilled in the relevant art(s) based on the following description of FIG. 5C.

Flowchart 530 begins with step 532. In step 532, the data protected by the security policy is decrypted. For example, verifier 208, as described with respect to FIG. 4, decrypts encrypted data 118. Verifier 208 may decrypt encrypted data 118 in various ways. In accordance with an embodiment and in response to verifying that the access criteria of security policy 202 is met, verifier 208 sends a key request (not shown in FIG. 4) for decryption key 226 associated with encrypted data 118 to key manager 204. For instance, in the context of the running example described above with respect to FIGS. 2-5B, verifier 208 sends a key request that specifies a data identifier that uniquely identifies Dan's encrypted data (e.g., encrypted data 118) and that is associated with Dan's decryption key (e.g., decryption key 226). In this context, key manager 204 returns Dan's decryption key to verifier 208 via a key response (not shown in FIG. 4). Verifier 208 sends a data request (not shown in FIG. 4) for Dan's encrypted data to data source 108. The data request specifies a data identifier that uniquely identifies Dan's encrypted data. Data source 108 returns Dan's encrypted data to verifier 208, which decrypts the encrypted data using Dan's decryption key.

In step 534, the decrypted data is provided to the at least one of the entities. For example, in the context of the running example, verifier 208 provides a decrypted version of Dan's encrypted data (e.g., encrypted data 118) to at least one of Costly Co legal, the law enforcement agency, and/or the court, via one or more responses, not shown in FIG. 4. In accordance with an embodiment, verifier 208 encrypts the decrypted version of Dan's data with a public key (e.g., a public key of the at least one entity (as stored in a respective identity map of identity maps 230A-230N), a public key of the at least one entity's application (e.g., applications 414A-414N), a public key of a document management and storage system (e.g., Microsoft SharePoint™ published by Microsoft® Corp.) that is to decrypt the resource, etc.). Verifier 208 obtains the public key from an identity map (e.g., identity maps 230A-230N), as described elsewhere herein. In accordance with such an embodiment, verifier 208 sends the data encrypted with the public key to a respective application of the at least one entity (e.g., applications 414A-414N). By doing so, the decrypted version of encrypted data 118 is protected from rogue users that may intercept communications between verifier 208 and the at least one entity.

Figure 5D:
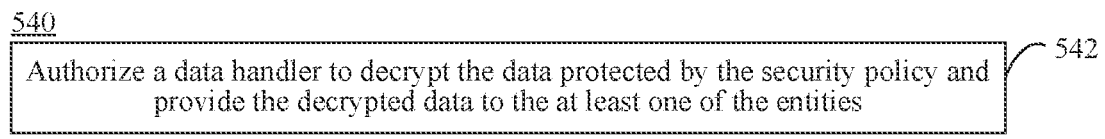
FIG. 5D shows a flowchart of a process for authorizing a data handler to provide decrypted data to at least one entity in accordance with an embodiment.

As discussed above, system 400 of FIG. 4 may operate in various ways to provide at least one entity with access to data protected by a security policy. For instance, verifier 208, as described above with respect to FIG. 4, in accordance with one or more embodiments, is not trusted to decrypt data protected by a security policy and operates to authorize another component of system 400, or external to system 400, to provide at least one entity with access to data protected by security policy 202. For example, FIG. 5D shows a flowchart 540 of a process for authorizing a data handler to provide decrypted data to at least one entity in accordance with an embodiment. Verifier 208 may operate according to flowchart 540 in embodiments. Flowchart 540 need not be performed in all embodiments. Flowchart 540 is a further embodiment of step 510 of flowchart 500 of FIG. 5A. Further structural and operational embodiments will be apparent to persons skilled in the relevant art(s) based on the following description of FIG. 5D.

Flowchart 540 includes step 542. In step 542, a data handler is authorized to decrypt the data protected by the security policy and provide the decrypted data to the at least one of the entities. For example, as shown in FIG. 4, verifier 208 transmits validation notification 428 to data handler 206, authorizing data handler to decrypt encrypted data 118 protected by security policy 202 and provide the decrypted data to the at least one of the entities. For instance, in accordance with the running example described above with respect to FIGS. 2-5B, and alternative to the example described above with respect to FIG. 5C, data handler 206 receives validation notification 428 and sends a key request 430 to key manager 204. Key request 430 specifies a data identifier that uniquely identifies Dan's encrypted data (e.g., encrypted data 118) and is associated with Dan's decryption key (e.g., decryption key 226). Key manager 204 returns Dan's decryption key via key response 432. As also shown in FIG. 4, data handler 206 also sends a data request 434 for Dan's encrypted data to data source 118. Data request 434 specifies a data identifier that uniquely identifies Dan's encrypted data. Data source 108 returns Dan's encrypted data via data response 436. Data handler 206 decrypts Dan's encrypted data using his decryption key and provides the decrypted version of his encrypted data to at least one entity (e.g., Costly Co legal, the law enforcement agency, and/or the court), a user on behalf of at least one entity, and/or an application on behalf of at least one entity (e.g., shown as application 414A of entity system 104A in FIG. 4) via an access response 438.

In accordance with an embodiment, data handler 206 encrypts the decrypted version of encrypted data 118 with a public key (e.g., a public key of the at least one entity (as stored in a respective identity map of identity maps 230A-230N), a public key of the at least one entity's application (e.g., applications 414A-414N), a public key of a document management and storage system (e.g., Microsoft SharePoint™ published by Microsoft® Corp.) that is to decrypt the resource, etc.). Data handler 206 obtains the public key from an identity map (e.g., identity maps 230A-230N), as described elsewhere herein. In accordance with such an embodiment, data handler 206 sends the data encrypted with the public key to a respective application of the at least one entity (e.g., applications 414A-414N). By doing so, the decrypted version of encrypted data 118 is protected from rogue users that may intercept communications between data handler 206 and the at least one entity.

In accordance with an embodiment, data handler 206 is a trusted data handler. In this context, data handler 206 is trusted to evaluate security policy 202 and decrypt encrypted data 118.

In accordance with one or more embodiments, data handler 206 is not a trusted data handler. For instance, with respect to the running example described with respect to FIG. 5D above, in one aspect, data handler 206 receives Dan's decryption key (e.g., decryption key 226) from key manager 204 via key response 432 and receives Dan's encrypted data (e.g., encrypted data 118) from data source 108 via data response 436. In this context, Dan's encrypted data is encrypted with a first layer of encryption corresponding to his decryption key and a second layer of encryption corresponding to a private key of at least one of Costly Co legal, the law enforcement agency, and/or the court. Data handler 206 decrypts the first layer of encryption of Dan's encrypted data using his decryption key and provides the at least one entity with the partially decrypted version of his encrypted data via access response 438. By doing so, the decrypted version of Dan's encrypted data is protected from rogue users that may infiltrate data handler 206 while still preventing Costly Co legal, the law enforcement agency, and/or the court from independently accessing the decrypted version of Dan's encrypted data without the access criteria of security policy 202 having been met.

In accordance with another embodiment where data handler 206 is not a trusted data handler, key request 430 includes an identity corresponding to the at least one entity. For instance, with respect to the running example described with respect to FIG. 5D above, in another aspect, in response to receiving key request 430, key manager 204 obtains a public key from a respective identity map (e.g., of identity maps 230A-230N) based at least on the identity included in key request 430 (e.g., the identity of Costly Co legal, the law enforcement agency, and/or the court). Key manager 204 encrypts Dan's decryption key (e.g., decryption key 226) with the public key obtained from the respective identity map and provides the encrypted version of Dan's decryption key to data handler 206 via key response 432. Data handler 206 obtains Dan's encrypted data (e.g., encrypted data 118), as described above, and provides the encrypted version of Dan's decryption key and Dan's encrypted data (e.g., via access response 438 of FIG. 4) to at least one entity (e.g., Costly Co legal, the law enforcement agency, and/or the court), a user on behalf of an entity (e.g., a member of Costly Co legal, the law enforcement agency, and/or the court), and/or an application (e.g., applications 414A-414N or a decryptor external to applications 414A-414N) that decrypts Dan's encrypted data using Dan's decryption key on behalf of at least one entity. By doing so, the decrypted version of Dan's encrypted data and the decrypted version of Dan's decryption key are protected from rogue users that may infiltrate data handler 206 while still preventing Costly Co legal, the law enforcement agency, and/or the court from independently accessing the decrypted version of encrypted data 118 without the access criteria of security policy 202 having been met.

In accordance with another embodiment, data handler 206 is not a trusted data handler and key manager 204 is not a trusted key manager. For instance, with respect to the running example described with respect to FIG. 5D above, in another aspect, Dan's decryption key (e.g., decryption key 226) is encrypted prior to providing decryption key 226 to key manager 204 (e.g., by Dan as part of or prior to step 306 of FIG. 3). In this context, key manager 204, in response to receiving key request 430, provides the encrypted version of Dan's decryption key to data handler 206 via key response 432. Data handler 206 provides the encrypted version of Dan's decryption key (e.g., via access response 438 of FIG. 4) to at least one entity (e.g., Costly Co legal, the law enforcement agency, and/or the court), a user on behalf of an entity, and/or an application that decrypts encrypted data 118 using decryption key 226 on behalf of at least one entity. By doing so, the decrypted version of Dan's encrypted data and the decrypted version of Dan's decryption key are protected from rogue users that may infiltrate key manager 204 and/or data handler 206 while still preventing Costly Co legal, the law enforcement agency, and/or the court from independently accessing the decrypted version of encrypted data 118 without the access criteria of security policy 202 having been met.

As discussed above, in accordance with one or more embodiments, data handler 206 obtains encrypted data 118 from data source 108 and provides either a decrypted version of encrypted data 118, a partially decrypted version of encrypted data 118, or an encrypted version of encrypted data 118 and an encrypted decryption key 226 to the at least one entity, a user on behalf of the entity, and/or an application that decrypts encrypted data 118 on behalf of the at least one entity, e.g., via access request 438 shown in FIG. 4. In accordance with one or more alternative embodiments, data handler 206 does not obtain encrypted data 118. For instance, with respect to the running example described with respect to FIG. 5D above, in another aspect, data handler 206 obtains Dan's decryption key (e.g., decryption key 226) (or an encrypted version of Dan's decryption key), as described above, and provides his decryption key (e.g., via access response 438 of FIG. 4) to the at least one entity (e.g., Costly Co legal, the law enforcement agency, and/or the court), user, and/or application. The at least one entity, user, and/or application accesses Dan's encrypted data (e.g., encrypted data 118) (e.g., from data source 108, from an on-premises data source, or from another data source accessible to the at least one entity, user, and/or application) and uses Dan's decryption key to decrypt his encrypted data. By doing so, Dan's encrypted data is further protected from rogue users that may intercept communications between Costly Co legal, the law enforcement agency, and/or the court and data handler 206. Furthermore, by not including Dan's encrypted data in access response 438, fewer computing resources are used by data handler 206, as data handler 206 does not need to obtain Dan's encrypted data from data source 108.

Embodiments of verifier 208, as described above with respect to FIG. 4, may operate in various ways to obtain respective encrypted secret shares from respective ledger databases. For example, FIG. 6 shows a flowchart 600 of a process for obtaining respective encrypted secret shares from respective ledger databases in accordance with an embodiment. Flowchart 600 is a further embodiment of steps 502 and 504 of flowchart 500 of FIG. 5A, in accordance with an embodiment. Verifier 208 of FIG. 4 may operate according to flowchart 600, in embodiments. Not all steps of flowchart 600 need be performed in all embodiments. Further structural and operational embodiments will be apparent to persons skilled in the relevant art(s) based on the following description of FIG. 6

Flowchart 600 starts with step 602, which is a further embodiment of step 502 of flowchart 500 of FIG. 5A in accordance with an embodiment. In step 602, a respective digital access request is received from each of a plurality of entities. Each digital access request comprises a respective proof and a respective digest representative of a state of the respective first ledger database. For example, continuing the running example described above in reference to FIG. 5A, verifier 208 receives digital access requests 424A-424N. In this context, each of digital access requests 424A-424N comprise a respective proof and a respective digest representative of the state of a respective ledger database (e.g., ledger databases 116A-116N). In accordance with an embodiment, digital access requests 424A-424N also comprise an identity (or a reference thereto) of a respective entity associated therewith. For instance, with respect to the running example, digital access request 424A comprises an identity of Costly Co legal, digital access request 424B comprises an identity of the law enforcement agency, and digital access request 424N comprises an identity of the court. In accordance with another embodiment, each of digital access request 424A-424N also comprise a policy ID representative of a security policy that the respective encrypted secret share is associated with. In accordance with an embodiment, for each digital access request, the respective proof, respective digest, the respective identity and/or the policy ID are included in separate requests to verifier 208. It is noted in embodiments that a plurality of digests is provided to verifier 208, where the plurality of digests comprises some or all of the digests previously generated by a respective ledger of a respective ledger database.

Flowchart 600 continues to step 604, which is a further embodiment of step 504 of flowchart 500 of FIG. 5A. In step 604, a respective digest is provided to the respective first ledger database. For example, verifier 208 of FIG. 4 provides respective digests received in step 602 to respective ledger databases 116A-116N (e.g., the digest received in digital access request 424A to ledger database 116A, the digest received in digital access request 424B to ledger database 116B, and the digest received in digital access request 424N to ledger database 116N). In accordance with an embodiment, the respective digests are provided to respective ledger databases as attribute requests that comprise a respective identity of a requesting entity (e.g., Costly Co legal, the law enforcement agency, and/or the court). Each respective digest is validated by the corresponding ledger database (e.g., of ledger databases 116A-116N). If a digest is not validated, the corresponding ledger database determines that the ledger database has been tampered with and issues a notification to verifier 208 and/or one of entity systems 104A-104N indicating the corresponding ledger database has been tampered with.

In response to validating the respective digest, a corresponding encrypted secret share is obtained. For instance, in response to validating the respective digest, a ledger database in accordance with an embodiment retrieves a corresponding encrypted secret share from a table (e.g., based on a respective identity and/or policy ID included in the corresponding digital access request). Once each digest has been validated, flowchart 600 continues to step 606.

In step 606, a response indicating the respective digest is valid is received from the respective first ledger database. The response comprises the respective encrypted secret share. For example, verifier 208 receives respective responses from each of ledger databases 116A-116N. In this context, each response comprises a respective encrypted secret share located by the respective ledger database, as described above and/or as would be understood by one ordinarily skilled in the relevant art(s) having benefit of this disclosure.

V. Additional Embodiments

A. Validating an Existing Proof

As described herein, a verifier in accordance with one or more embodiments is configured to verify proofs of that secret shares correspond to a decryption key to decrypt data protected by a security policy. For example, verifier 208, as described with respect to FIG. 2 above, is configured to verify that a policy proof corresponds to encrypted secret shares and an encrypted decryption key. In accordance with one or more embodiments, any user or entity can provide such a policy proof to verifier 208 to verify that the policy proof is valid with respect to an existing security policy. By doing so, any user or entity is able to validate the proof via verifier 208 without requiring access to all of (or any of) the unencrypted versions of the secret shares and decryption keys corresponding to the proof.

Figure 7:
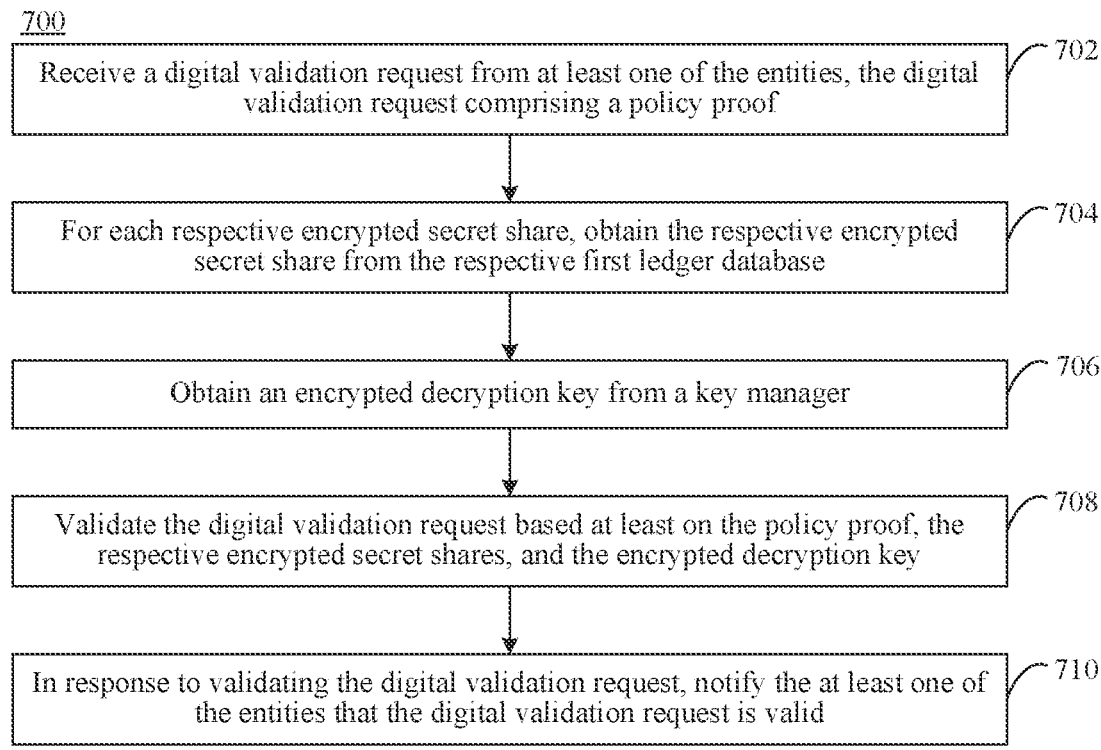
FIG. 7 shows a flowchart of a process for validating a policy proof in accordance with an embodiment.
Figure 8:
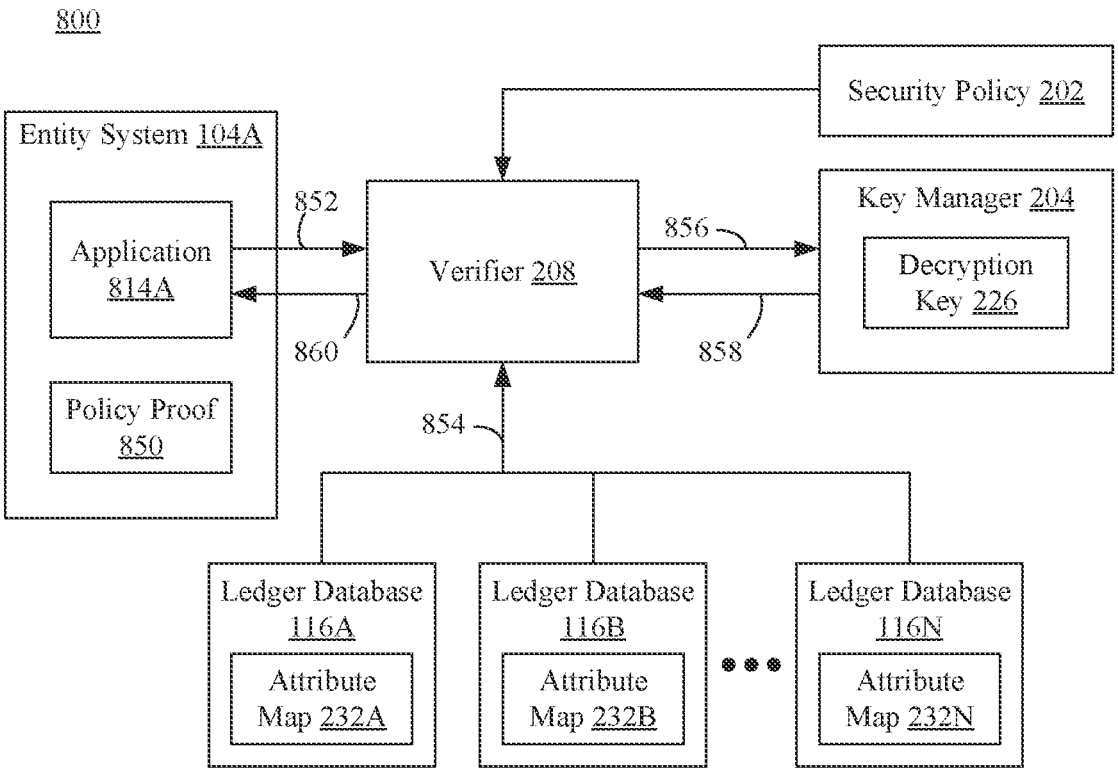
FIG. 8 shows a block diagram of a system for validating a policy proof in accordance with an embodiment.

Verifier 208 may operate in various ways to verify an existing policy proof, in embodiments. For example, FIG. 7 shows a flowchart 700 of a process for validating a policy proof in accordance with an embodiment. Verifier 208 may operate according to flowchart 700, in embodiments. For purposes of illustration, flowchart 700 is described with respect to FIG. 8. FIG. 8 shows a block diagram of a system 800 for validating a policy proof in accordance with an embodiment. As shown in FIG. 8, system 800 includes entity system 104A, ledger databases 116A-116N, security policy 202, key manager 204, and verifier 208, as described elsewhere herein. As also shown in FIG. 8, entity system 104A comprises an application 814A and a policy proof 850. Application 814A is a further embodiment of application 414A described above with reference to FIG. 4. Policy proof 850 is a policy proof corresponding to security policy 202, one or more encrypted secret shares stored in attribute maps 232A-232N (e.g., encrypted versions of secret shares 228A-228N described above with respect to FIGS. 2 and 4), and an encrypted decryption key (e.g., an encrypted version of decryption key 226). For instance, policy proof 850 in accordance with an embodiment is the policy proof generated using proof generator 220, as described above with respect to FIGS. 2 and 3. Flowchart 700 and system 800 are described as follows. Note that not all steps of flowchart 700 need be performed in all embodiments. Further structural and operational embodiments will be apparent to persons skilled in the relevant art(s) based on the following descriptions of FIGS. 7 and 8.

Flowchart 700 starts with step 702. In step 702, a digital validation request is received from an entity. The digital validation request comprises a policy proof. For instance, in reference to the running example described above with respect to FIGS. 2-5A, verifier 208 receives a digital validation request 852 from application 814A on behalf of Costly Co legal, as shown in FIG. 8. Digital validation request 852 comprises (zero knowledge cryptographic) policy proof 850. In accordance with an embodiment, digital validation request includes a policy ID that uniquely identifies the security policy (e.g., security policy 202) that policy proof 850 corresponds to.

In step 704, for each respective encrypted secret share, the respective encrypted secret share is obtained from the respective first ledger database. For example, verifier 208 obtains one or more respective encrypted secret share(s) 854 from ledger databases 116A-116N (e.g., stored in respective attribute maps 232A-232N). Verifier 208 obtains the one or more respective encrypted secret share(s) 854 using any of the techniques described elsewhere herein. In accordance with an embodiment, and with reference to the running example, verifier 208 accesses security policy 202. Verifier 208 analyzes security policy 202 and digital validation request 852 to determine that encrypted versions of secret shares provided by Dan (or on behalf of Dan) to Costly Co legal, the law enforcement agency, and the court correspond to security policy 202. In this context, verifier 208 determines which respective encrypted secret share(s) to obtain from respective ledger databases 116A-116N.

In step 706, an encrypted decryption key is obtained from a key manager. For example, verifier 208 obtains an encrypted version of decryption key 226 from key manager 204. For instance, with continued reference to the running example described above, verifier 208 provides a key request 856 to key manager 204. Key request 856 in accordance with an embodiment includes a policy ID that uniquely identifies security policy 202 and is associated with Dan's decryption key (e.g., decryption key 226). In response to receiving key request 856, key manager 204 encrypts Dan's decryption key with a public key associated with the decryption key (e.g., a public key associated with Dan). Key manager 226 obtains the public key from a respective identity map (e.g., of identity maps 230A-230N) of a respective ledger database (e.g., of ledger databases 116A-116N). Alternatively, Dan's decryption key is stored in key manager 226 as an encrypted decryption key, as described elsewhere herein. Key manager 226 provides the encrypted version of Dan's decryption key to verifier 208 via key response 858.

In step 708, the digital validation request is validated based at least on the policy proof, the respective encrypted secret shares, and the encrypted decryption key. For instance, and with continued reference to the running example described above, verifier 208 determines if policy proof 850 corresponds to the encrypted version of Dan's decryption key (e.g., decryption key 226) and respective encrypted secret shares of Costly Co legal, the law enforcement agency, and the court (e.g., respective encrypted secret shares 854). In accordance with an embodiment, verifier 208 is a proof verifier that verifies (cryptographic) policy proof 850 based at least on the encrypted version of Dan's decryption key and respective encrypted secret shares 854. In accordance with another embodiment, verifier 208 is a proof verifier that verifies (cryptographic) policy proof 850 based at least on the encrypted version of Dan's decryption key, respective encrypted secret shares 854, and a public key of an entity (e.g., a public key associated with Dan). In this context, verifier 208 retrieves the public key from a respective identity map (e.g., of identity maps 230A-230N) of a respective ledger database (e.g., of ledger databases 116A-116N). In accordance with an embodiment, verifier 208 verifies policy proof 850 based on a zero-knowledge protocol, such as, but not limited to, Schnorr's protocol. In response to determining that policy proof 850 is verified, verifier 208 validates digital validation request 852 and flowchart 700 proceeds to step 710.

In response to determining that policy proof does is not verified, verifier 208 does not validate digital validation request 852. In accordance with an embodiment, in response to not validating digital validation request 852, verifier 208 transmits a notification (not shown in FIG. 2) to application 814 or Costly Co legal indicating that policy proof 850 is not valid.

In step 710, in response to validating the digital validation request, the entity is notified that the digital validation request is valid. For example, as shown in FIG. 8, verifier 208 transmits a validation notification 860 to application 814A indicating that digital validation request 860 is valid in response to validating the request. Examples of validation notification 860 include, but are not limited to, a short messaging service (SMS) message, a telephone call, an e-mail, a notification that is presented via an application associated with the entity (e.g., application 814A), etc. In accordance with an embodiment, validation notification 860 indicates the entities associated with each of respective encrypted secret shares 854 (e.g., Costly Co legal, the law enforcement agency, and the court). For instance, validation notification 860 in accordance with an embodiment includes (e.g., a list of) entity IDs that uniquely identify the associated entities. By doing so, validation notification 860 enables application 814A (or Costly Co legal) to identify the entities associated with secret shares required to access data protected by security policy 202. For instance, with continued reference to the running example described above, if Costly Co legal possessed a first secret share of the respective secret shares and desired to know (or verify) which other entities possessed secret shares of the respective secret shares, Costly Co legal (or application 814A on behalf of Costly Co legal) could analyze the identities of the entities included in validation notification 852 to determine that the law enforcement agency and the court possess secret shares of the respective secret shares. By enabling Costly Co legal to (or application 814A on behalf of Costly Co legal) to identify the entities associated with secret shares, embodiments described herein are able to verify security policies are updated and/or that the correct entities possess secret shares without revealing the secret shares.

Embodiments of verifier 208 may operate to validate existing policy proofs in other ways as well. For instance, in response to receiving digital validation request 852, verifier 208 in accordance with an embodiment access a stored version of the existing policy proof (e.g., stored by verifier 208, data handler 206, or in a data source accessible to verifier 208). Verifier 208 compares the existing policy proof to policy proof 850 received in digital validation request 852. If the existing policy proof matches policy proof 850, verifier 208 validates digital validation request 852 and notifies the entity, as described above. Otherwise, verifier 208 does not validate digital validation request 852, as described above.

B. Policy Trees

FIGS. 2-8 have been described above with respect to secret shares corresponding to a decryption key suitable to decrypt data protected by a security policy. It is further contemplated herein that a security policy may include more than one sub-policies to provide access to a decryption key and/or the data protected by the security policy. For example, a user may specify multiple security policies that, when respective access criteria of any one security policy is met, enable at least one entity to access data protected by the multiple access policies. For instance, a user may specify a first security policy that enables the user to self-identify in order to access data protected by the multiple security policies and a second security policy (e.g., a secret share policy) that enables at least one entity to access the protected data when the access criteria is met (e.g., each of a plurality of entities provide respective proofs of respective secret shares to a verifier, as described herein).

Figure 9:
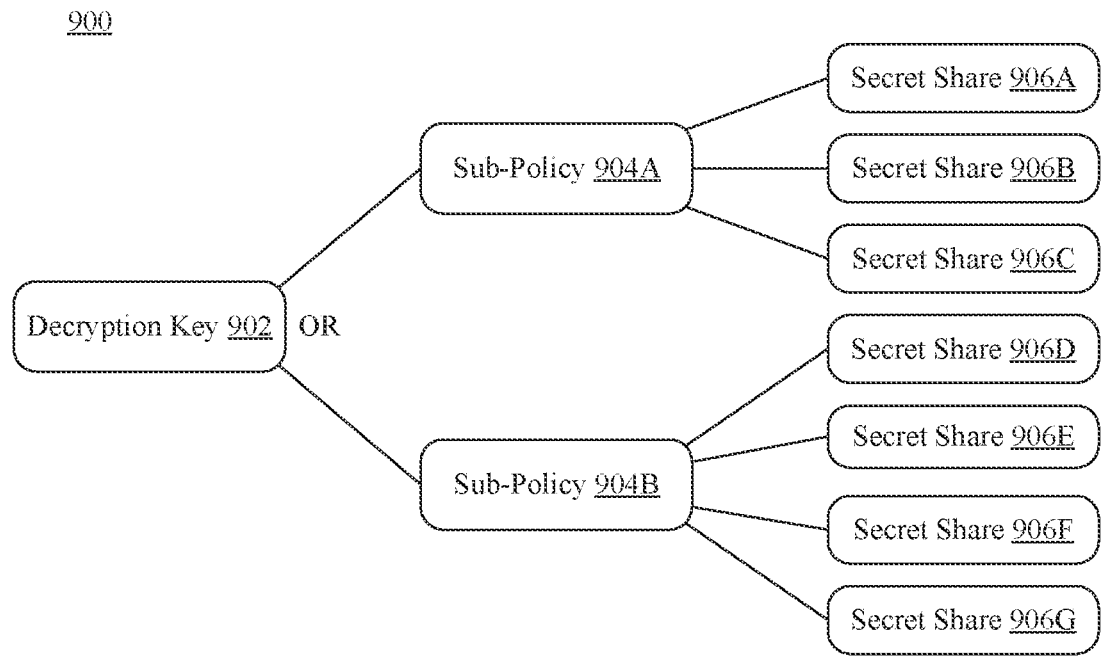
FIG. 9 depicts a policy tree in accordance with an embodiment.

It is also contemplated herein that a user may specify multiple secret share policies that enable entities holding respective secret shares of respective secret share policies of the multiple secret share policies to access the data protected by the multiple secret share policies. Such multiple secret share policies may be represented by a policy tree. For example, FIG. 9 depicts a policy tree 900 in accordance with an embodiment. Further structural and operational examples will be apparent to persons skilled in the relevant art(s) based on the following description of FIG. 9.

Policy tree 900 as illustrated details a security policy that includes multiple secret share policies. The security policy associated with policy tree 900 may be accessed, e.g., by orchestrator 106 or a component thereof (e.g., data handler 206 and/or verifier 206), to determine (encrypted) secret shares that correspond to the security policy, decryption keys associated with the security policy, and/or data protected by the security policy. Policy trees may include tiers of one or more decryption keys, policies, sub-policies, and/or secret shares. Furthermore, policy trees may specify whether multiple sub-policies need to be met before a decryption key is released, or if at least one (or more) of multiple sub-policies need to be met before a decryption key is released. For instance, in policy tree 900, decryption key 902 is associated with sub-policies 904A and 904B. Sub-policy 904A is associated with secret shares 906A-906C. Sub-policy 904B is associated with secret shares 906D-906G.

As shown in FIG. 9, policy tree 900 specifies that decryption key 902 is to be released when access criteria of either sub-policy 904A or sub-policy 904B is met. For instance, suppose sub-policy 904A corresponds to security policy 202 as described above with reference to the running example described with respect to FIGS. 2-5A. In this context, secret share 906A is a first secret share associated with Costly Co legal, secret share 906B is a second secret share associated with the law enforcement agency, and secret share 906C is a third secret share associated with the court. As shown in FIG. 9, access criteria of sub-policy 904A is met when proof of each of secret shares 906A-906C is validated. In this context, access to decryption key 902 is granted when access criteria of sub-policy 904A is met. As also shown in FIG. 9, access criteria of sub-policy 904B is met when proof of each of secret shares 906D-906G is validated. Proof of each respective secret share may be validated in various ways described elsewhere herein (e.g., as discussed with respect to FIGS. 4-6 above and/or FIG. 10 below).

As shown in FIG. 9, each of sub-policies 904A and 904B are associated with distinct respective secret shares. However, in accordance with an alternative embodiment, one or more secret shares are repeated across one or more sub-policies. For instance, in accordance with an embodiment, secret shares 906A and 906D are the same secret share, secret shares 906B and 906E are the same secret share, and secret shares 906C and 906F are the same secret share. Furthermore, as will be discussed further below with respect to FIG. 10, sub-policies 904A and/or 904B may specify an isolated purpose for which decryption key 902 is released.

C. Isolation of Purposes

Figure 10:
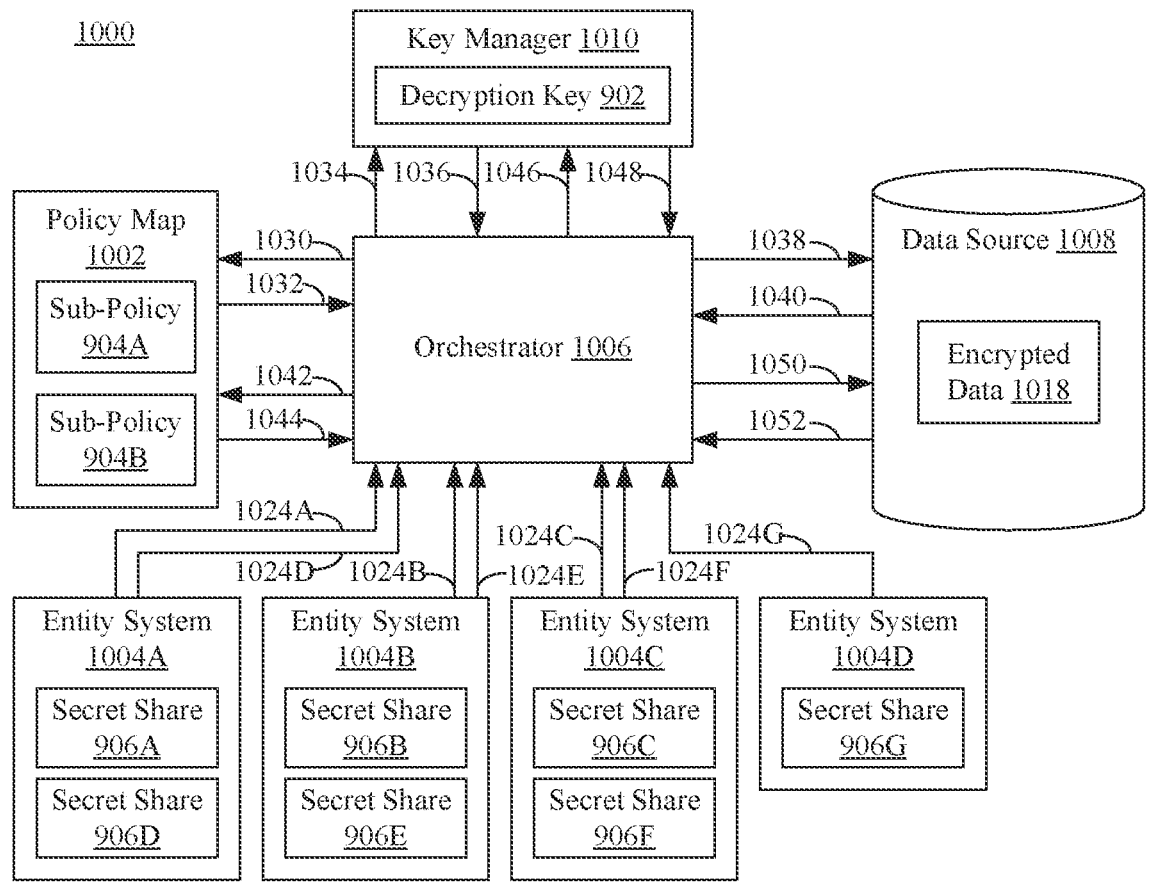
FIG. 10 shows a block diagram of a system for accessing data based on a policy of the policy tree of FIG. 9.

In accordance with an embodiment, a decryption key is subject to multiple policies (or sub-policies), such as the sub-policies described above with respect to FIG. 9. In accordance with a further embodiment, each sub-policy is associated with a respective purpose (e.g., an action). In this context, usage of the decryption key for a first purpose is authorized if access criteria of a first sub-policy is met, usage of the decryption key for a second purpose is authorized if access criteria of a second sub-policy is met, and so-on, for each sub-policy associated with the decryption key. In accordance with an embodiment, a system is configured to enable entities to prove possession of secret shares in order to use the decryption key (e.g., either directly or via a data handler or decrypter on behalf of the entity) to access data protected by the corresponding sub-policy for the respective purpose. For example, FIG. 10 shows a block diagram of a system 1000 for accessing data based on a policy of policy tree 900 of FIG. 9. System 1000 is described as follows with respect to policy tree 900. Further structural and operational examples will be apparent to persons skilled in the relevant art(s) based on the following description of FIG. 10.

As shown in FIG. 10, system 1000 includes a policy map 1002, entity systems 1004A-1004D, an orchestrator 1006, a data source 1008, and a key manager 1010. Entity systems 1004A-1004D are example embodiments of entity systems 104A-104N, orchestrator 1006 is an example embodiment of orchestrator 106, and data source 1008 is an example embodiment of data source 108, as each respectively described above with respect to FIG. 1. Key manager 1010 is an example embodiment of key manager 204, as described above with respect to FIG. 2, and is configured to store decryption key 902 of policy tree 900 of FIG. 9.

Each of entity systems 1004A-1004D store respective secret shares of policy tree 900 of FIG. 9. For instance, entity system 1004A stores secret share 906A and secret share 906D, entity system 1004B stores secret share 906A and secret share 906E, entity system 1004C stores secret share 906C and secret share 906F, and entity system 1004D stores secret share 906G. Secret shares 906A-906G are distributed to each of respective entity systems 1004A-1004D by the user (or an application on behalf of the user) that generated secret shares 906A-906G (or that secret shares 906A-906G were generated on behalf of, e.g., by an application). For example, secret shares 906A-906G in accordance with an embodiment are generated by secret share generator 250 as described above with respect to FIG. 2.

Data source 1008 is configured to maintain data protected by security policies (e.g., the security policy of policy tree 900). For instance, as shown in FIG. 10, data source 1008 maintains encrypted data 1018A and encrypted data 1018B. Encrypted data 1018A is protected by sub-policy 904A of policy tree 900 and encrypted data 1018B is protected by sub-policy 904B of policy tree 900.

Policy map 1002 is configured to store one or more policies ("policies" hereinafter) for data maintained by data source 1008. For example, as shown in FIG. 10, policy map 1002 stores sub-policy 904A and sub-policy 904B of FIG. 9, each corresponding to encrypted data 1018. Each of the policies specify one or more conditions that are required to be satisfied for a user to perform a certain action with respect to corresponding data for a particular purpose. Policy map 1002 associates each policy with a policy ID, which uniquely identifies a corresponding policy. Such actions include, but are not limited to, accessing data (e.g., reading the data or modifying the data), sending the data to another user, sending a communication associated with the data to another user, etc. The purposes include, but are not limited to, performing a blind subpoena, applying for a loan, applying for a credit card, providing enhanced customer experience, performing an administrative task with respect to the data, and/or any other purpose that would require access to the data protected by the security policy. The conditions include, but are not limited to, particular secret shares required to perform the action, a particular identity of a particular user authorized to perform the action, particular attributes that the identity (or user) is required to have to perform the action, a location at which the user (and/or a computing device associated therewith) is required to be to perform the action, and/or the like. Examples of locations include, but are not limited to, a particular room or building, a particular vehicle or vessel (e.g., a particular car, a particular submarine, a particular aircraft carrier, etc.), a particular city, a particular country, etc. In accordance with an embodiment, policy map 1002 is maintained by a ledger database (e.g., ledger databases 116A-116N of FIG. 1). In this context, policies stored in policy map 1002 may be accessed in a similar manner as information stored in identity maps and/or attribute maps, as described elsewhere herein.

With respect to FIGS. 9 and 10, sub-policy 904A is associated with a first policy ID and specifies that valid proof of secret shares 906A-906C is required before decryption key 902 may be used to access encrypted data 1018 for a first purpose and sub-policy 904B is associated with a second policy ID and specifies that valid proof of secret shares 906D-906G is required before decryption key 902 may be used to access encrypted data 1018 for a second purpose. By doing so, a single decryption key (e.g., decryption key 902) may be used to access data protected by sub-policies (e.g., sub-policies 904A and 904B) of a security policy associated with the decryption key in a manner that limits the use of the decryption key for a respective purpose of the sub-policy for which access criteria is met.

As a non-limiting example, suppose encrypted data 1018 includes various data sets used for financial purposes (e.g., credit card applications, loan applications, enhanced customer experiences, and administrative purposes). In this example, entity system 104A is associated with a personal identifiable information (PII) custodian, entity system 104B is associated with a credit worthiness custodian, entity system 104C is associated with a custodian for client permissions for payment forecasting ("payment custodian" hereinafter), and entity system 104D is associated with a customer analytics custodian. In this example, sub-policy 904A of policy tree 900 specifies that valid proof of secret shares 906A-906C is required to use decryption key 902 to access encrypted data 1018 for applying to a loan and sub-policy 904B of policy tree 900 specifies that valid proof of secret shares 906D-906G is required to use decryption key 902 to access encrypted data 1018 for apply for a credit card.

In this non-limiting example, suppose the payment custodian is requesting access to encrypted data 1018 for applying for a loan on behalf of a customer. In this context, entity system 1004C transmits a digital access request 1024C to orchestrator 1006 comprising a policy ID corresponding to sub-policy 904A and a proof corresponding to secret share 906C. In accordance with an embodiment, orchestrator 1006 analyzes the policy ID received in digital access request 1024C and sends a policy request 1030 comprising the policy ID to policy map 1002. In accordance with an embodiment where policy map 1002 is maintained by a ledger database, digital access request 1024C and policy request 1030 also include a digest representative of the state of the ledger database that maintains policy map 1002. In this context, the ledger database that maintains policy map 1002 is validated based at least on the digest in response to policy map 1002 receiving policy request 1030 (e.g., in a manner similar to that described with respect to attribute map 332A and FIG. 7 above).

Policy map 1002 returns a policy response 1032 to orchestrator 1006 comprising sub-policy 904A. In response to receiving policy response 1032, orchestrator 1006 determines valid proof corresponding to secret shares 906A, 906B, and 906C are required to provide the payment custodian access to encrypted data 1018 for the loan application. In accordance with an embodiment, orchestrator 1006 prompts the PII custodian, the credit worthiness custodian, and the payment custodian (or users and/or applications on behalf of the respective custodians to provide respective proofs corresponding to respective secret shares 906A, 906B, and 906C. As shown in FIG. 10, entity systems 1004A and 1004B provide respective digital access requests 1024A and 1024B, each comprising at least respective proofs corresponding to respective secret shares 906A and 906B. As discussed above, entity system 1004C provided a respective proof corresponding to respective secret share 906C in digital access request 1024C. Alternatively, the initial digital access request 1024C does not include the respective proof. In this context, entity system 1004C provides the respective proof via a subsequent digital access request 1024C in response to being prompted by orchestrator 1006.

Orchestrator 1006, or a verifier external to orchestrator 1006, determines if each of digital access requests 1024A-1024C are valid in a similar manner to the techniques described herein. If any of digital access requests 1024A-1024C are not valid, orchestrator 1006, or a verifier external to orchestrator 1006, notifies at least one of entity systems 1004A-1004D that at least one of the digital access requests 1024A-1024C were not validated and access to encrypted data 1018 for the loan application was not granted. In response to the validation of all of digital access requests 1024A-1024C, orchestrator 1006 obtains decryption key 902 from key manager 1010 (e.g., by transmitting a key request 1034 and subsequently receiving a key response 1036 comprising decryption key 902, as shown in FIG. 10) and obtains encrypted data 1018 from data source 1008 (e.g., by transmitting a data request 1038 and subsequently receiving a data response 1040 comprising encrypted data 1018). In accordance with an embodiment, orchestrator 1006 decrypts encrypted data 1018 using decryption key 902 and provides the decrypted version of encrypted data 1018 to the payment custodian. In accordance with an embodiment, orchestrator 1006 provides decryption key 902 (or an encrypted version of decryption key 902) and/or encrypted data 1018 to the payment custodian, a user acting on behalf of the payment custodian, or an application associated with the payment custodian, for decryption thereby. In accordance with an embodiment, orchestrator 1006, key manager 1010, and/or data source 1008 place a restriction upon decryption key 902, encrypted data 1018, and/or the decrypted version of encrypted data 1018 that prevents the payment custodian from using decryption key 902 and/or the decrypted version of encrypted data 1018 for a purpose other than applying for a loan on behalf of the customer.

Continuing the non-limiting example with reference to FIGS. 9 and 10, suppose the payment custodian is requesting access to encrypted data 1018 for applying for a credit card on behalf of the customer. In this context, entity system 1004C transmits a digital access request 1024F to orchestrator 1006 comprising a policy ID corresponding to sub-policy 904B and a proof corresponding to secret share 906F (and optionally a digest representative of the state of the ledger database that maintains policy map 1002). Orchestrator 1006 analyzes the policy ID, sends a policy request 1042 comprising the policy ID (and optionally the digest if included in digital access request 1024F), and receives policy response 1044 comprising sub-policy 904B.

In response to receiving policy response 1044, orchestrator 1006 determines the secret shares required by sub-policy 904B (e.g., secret shares 906D, 906E, 906F, and 906G) and prompts the PII custodian, the credit worthiness custodian, the payment custodian, and the customer analytics custodian (or respective users and/or applications on behalf of the respective custodians) to provide respective proofs corresponding to respective secret shares 906D, 906E, 906F, and 906G. As shown in FIG. 10, entity systems 1004A-1004D provide respective digital access requests 1024D-1024G, each comprising respective proofs corresponding to respective secret shares 906D-906G. As discussed above, entity system 1004C provided a respective proof corresponding to respective secret share 906F in digital access request 1024F. Alternatively, the initial digital access request 1024F does not include the respective proof. In this context, entity system 1004C provides the respective proof via a subsequent digital access request 1024F in response to being prompted by orchestrator 1006.

Orchestrator 1006, or a verifier external to orchestrator 1006, determines if each of digital access requests 1024D-1024G are valid or not valid as described above with respect to the loan application example and digital access requests 1024A-1024C. In response to validating all of digital access requests 1024D-1024G, orchestrator 1006 obtains decryption key 902 from key manager 1010 (e.g., by transmitting a key request 1046 and subsequently receiving a key response 1048 comprising decryption key 902, as shown in FIG. 10) and obtains encrypted data 1018 from data source 1008 (e.g., by transmitting a data request 1050 and subsequently receiving a data response 1052 comprising encrypted data 1018). In accordance with an embodiment, orchestrator 1006 decrypts encrypted data 1018 using decryption key 902 and provides the decrypted version of encrypted data 1018 to the payment custodian. In accordance with an embodiment, orchestrator 1006 provides decryption key 902 (or an encrypted version of decryption key 902) and/or encrypted data 1018 to the payment custodian, a user acting on behalf of the payment custodian, or an application associated with the payment custodian, for decryption thereby. In accordance with an embodiment, orchestrator 1006, key manager 1010, and/or data source 1008 place a restriction upon decryption key 902, encrypted data 1018, and/or the decrypted version of encrypted data 1018 that prevents the payment custodian from using decryption key 902 and/or the decrypted version of encrypted data 1018 for a purpose other than applying for a credit card on behalf of the customer.

In the non-limiting example discussed above with respect to FIGS. 9 and 10, an entity (e.g., the payment custodian) that possess one of the secret shares initiates the request to access encrypted data 1018 for either applying for a loan or a credit card. However, it is also contemplated herein that another entity may initiate the request to access encrypted data 1018 for an isolated purpose. For example, the customer for which a loan or credit card may initiate the access request. In accordance with an embodiment, each custodian provides respective proofs to orchestrator 1006 as an indication that the respective custodian approves the application for the loan or credit card on behalf of (or by the) customer). As shown in FIG. 10, secret shares 906A-906G are individual secret shares. In accordance with one or more alternative embodiments, one or more secret shares stored by the same entity system are the same secret share. For instance, in accordance with an embodiment, entity system 1004A stores secret shares 906A and 906D as the same secret share, entity system 1004B stores secret shares 906B and 906E as the same secret share, and entity system 1004C stores secret shares 906C and 906F as the same secret share.

VI. Example Mobile Device and Computer System Implementation

Each of system 100, system 200, system 400, system 800, system 1000, and/or each of the steps of flowcharts 300, 500, 520, 530, 540, 600, and/or 700 may be implemented in hardware, or hardware combined with software and/or firmware. For example, system 100, system 200, system 400, system 800, and/or system 1000 (and/or any of the components thereof) and/or the steps of flowcharts 300, 500, 520, 530, 540, 600, and/or 700 may be implemented as computer program code (e.g., instructions in a programming language) configured to be executed in one or more processors and stored in a computer readable storage medium. Alternatively, system 100, system 200, system 400, system 800, and/or system 1000 (and/or any of the components thereof) and/or the steps of flowcharts 300, 500, 520, 530, 540, 600, and/or 700 may be implemented as hardware logic/electrical circuitry, such as being implemented together in a system-on-chip (SoC), a field programmable gate array (FPGA), or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 11:
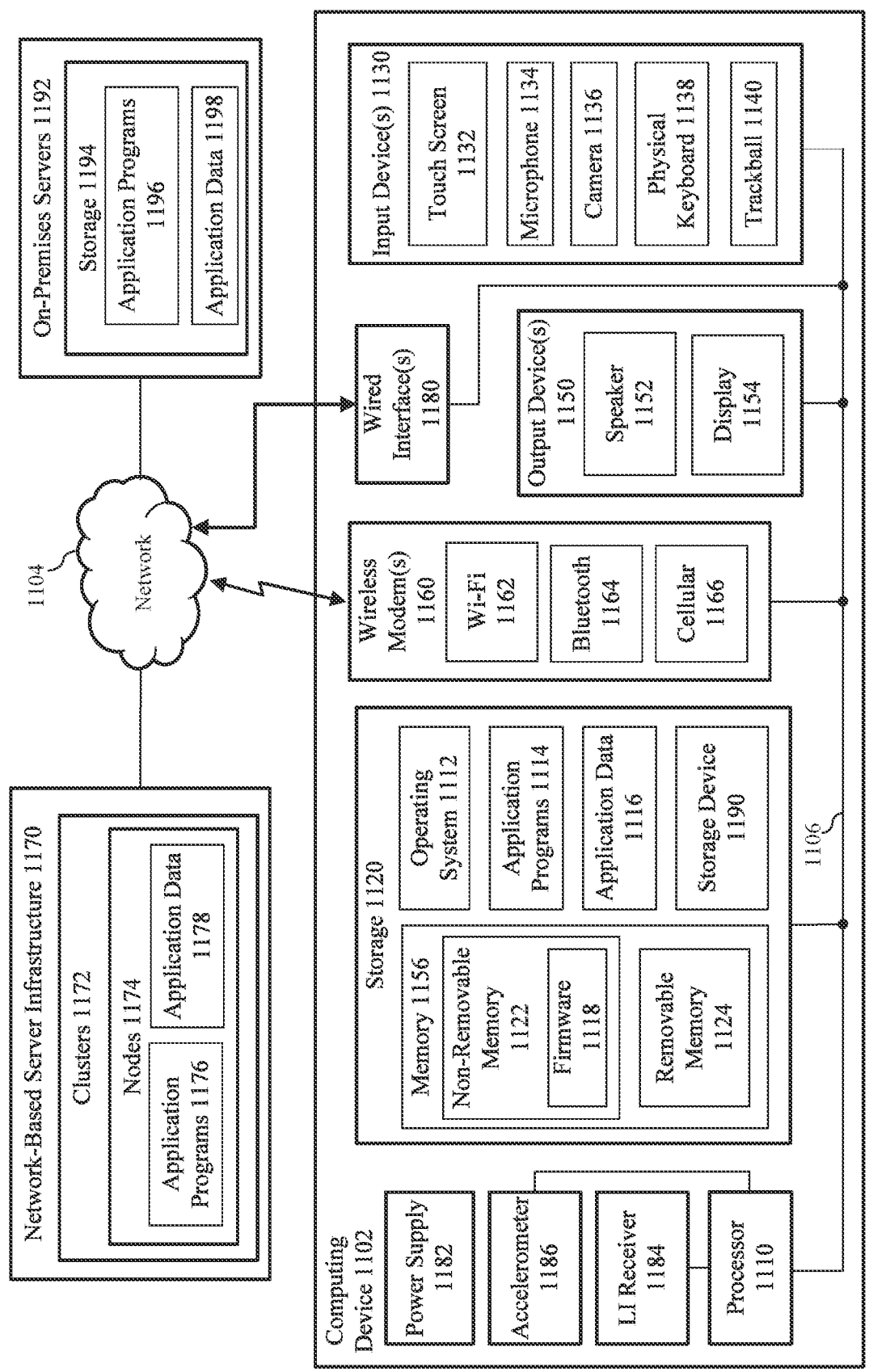
FIG. 11 shows a block diagram of an example computer system in which embodiments may be implemented.

Embodiments disclosed herein may be implemented in one or more computing devices that may be mobile (a mobile device) and/or stationary (a stationary device) and may include any combination of the features of such mobile and stationary computing devices. Examples of computing devices in which embodiments may be implemented are described as follows with respect to FIG. 11. FIG. 11 shows a block diagram of an exemplary computing environment 1100 that includes a computing device 1102. In some embodiments, computing device 1102 is communicatively coupled with devices (not shown in FIG. 11) external to computing environment 1100 via network 1104. Network 1104 comprises one or more networks such as local area networks (LANs), wide area networks (WANs), enterprise networks, the Internet, etc., and may include one or more wired and/or wireless portions. Network 1104 may additional or alternatively include a cellular network for cellular communications. Computing device 1102 is described in detail as follows Computing device 1102 can be any of a variety of types of computing devices. For example, computing device 1102 may be a mobile computing device such as a handheld computer (e.g., a personal digital assistant (PDA)), a laptop computer, a tablet computer (such as an Apple iPad™), a hybrid device, a notebook computer (e.g., a Google Chromebook™ by Google LLC), a netbook, a mobile phone (e.g., a cell phone, a smart phone such as an Apple® iPhone® by Apple Inc., a phone implementing the Google® Android™ operating system, etc.), a wearable computing device (e.g., a head-mounted augmented reality and/or virtual reality device including smart glasses such as Google® Glass™, Oculus Rift® of Facebook Technologies, LLC, etc.), or other type of mobile computing device. Computing device 1102 may alternatively be a stationary computing device such as a desktop computer, a personal computer (PC), a stationary server device, a minicomputer, a mainframe, a supercomputer, etc.

As shown in FIG. 11, computing device 1102 includes a variety of hardware and software components, including a processor 1110, a storage 1120, one or more input devices 1130, one or more output devices 1150, one or more wireless modems 1160, one or more wired interface(s) 1180, a power supply 1182, a location information (LI) receiver 1184, and an accelerometer 1186. Storage 1120 includes memory 1156, which includes non-removable memory 1122 and removable memory 1124, and a storage device 1190. Storage 1120 also stores an operating system 1112, application programs 1114, and application data 1116. Wireless modem(s) 1160 include a Wi-Fi modem 1162, a Bluetooth modem 1164, and a cellular modem 1166. Output device(s) 1150 includes a speaker 1152 and a display 1154. Input device(s) 1130 includes a touch screen 1132, a microphone 1134, a camera 1136, a physical keyboard 1138, and a trackball 1140. Not all components of computing device 1102 shown in FIG. 11 are present in all embodiments, additional components not shown may be present, and any combination of the components may be present in a particular embodiment. These components of computing device 1102 are described as follows.

A single processor 1110 (e.g., central processing unit (CPU), microcontroller, a microprocessor, signal processor, ASIC (application specific integrated circuit), and/or other physical hardware processor circuit) or multiple processors 1110 may be present in computing device 1102 for performing such tasks as program execution, signal coding, data processing, input/output processing, power control, and/or other functions. Processor 1110 may be a single-core or multi-core processor, and each processor core may be single-threaded or multithreaded (to provide multiple threads of execution concurrently). Processor 1110 is configured to execute program code stored in a computer readable medium, such as program code of operating system 1112 and application programs 1114 stored in storage 1120. Operating system 1112 controls the allocation and usage of the components of computing device 1102 and provides support for one or more application programs 1114 (also referred to as "applications" or "apps"). Application programs 1114 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein.

Any component in computing device 1102 can communicate with any other component according to function, although not all connections are shown for ease of illustration. For instance, as shown in FIG. 11, bus 1106 is a multiple signal line communication medium (e.g., conductive traces in silicon, metal traces along a motherboard, wires, etc.) that may be present to communicatively couple processor 1110 to various other components of computing device 1102, although in other embodiments, an alternative bus, further busses, and/or one or more individual signal lines may be present to communicatively couple components. Bus 1106 represents one or more of any of several types of bus structures, including a memory bus or memory controller, a peripheral bus, an accelerated graphics port, and a processor or local bus using any of a variety of bus architectures.

Storage 1120 is physical storage that includes one or both of memory 1156 and storage device 1190, which store operating system 1112, application programs 1114, and application data 1116 according to any distribution. Non-removable memory 1122 includes one or more of RAM (random access memory), ROM (read only memory), flash memory, a solid-state drive (SSD), a hard disk drive (e.g., a disk drive for reading from and writing to a hard disk), and/or other physical memory device type. Non-removable memory 1122 may include main memory and may be separate from or fabricated in a same integrated circuit as processor 1110. As shown in FIG. 11, non-removable memory 1122 stores firmware 1118, which may be present to provide low-level control of hardware. Examples of firmware 1118 include BIOS (Basic Input/Output System, such as on personal computers) and boot firmware (e.g., on smart phones). Removable memory 1124 may be inserted into a receptacle of or otherwise coupled to computing device 1102 and can be removed by a user from computing device 1102. Removable memory 1124 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 1190 may be present that are internal and/or external to a housing of computing device 1102 and may or may not be removable. Examples of storage device 1190 include a hard disk drive, a SSD, a thumb drive (e.g., a USB (Universal Serial Bus) flash drive), or other physical storage device.

One or more programs may be stored in storage 1120. Such programs include operating system 1112, one or more application programs 1114, and other program modules and program data. Examples of such application programs may include, for example, computer program logic (e.g., computer program code/instructions) for implementing one or more of system 100, system 200, system 400, system 800, and/or system 1000, along with any components and/or subcomponents thereof, as well as the flowcharts/flow diagrams (e.g., flowcharts 300, 500, 520, 530, 540, 600, and/or 700) described herein, including portions thereof, and/or further examples described herein.

Storage 1120 also stores data used and/or generated by operating system 1112 and application programs 1114 as application data 1116. Examples of application data 1116 include web pages, text, images, tables, sound files, video data, and other data, which may also be sent to and/or received from one or more network servers or other devices via one or more wired or wireless networks. Storage 1120 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

A user may enter commands and information into computing device 1102 through one or more input devices 1130 and may receive information from computing device 1102 through one or more output devices 1150. Input device(s) 1130 may include one or more of touch screen 1132, microphone 1134, camera 1136, physical keyboard 1138 and/or trackball 1140 and output device(s) 1150 may include one or more of speaker 1152 and display 1154. Each of input device(s) 1130 and output device(s) 1150 may be integral to computing device 1102 (e.g., built into a housing of computing device 1102) or external to computing device 1102 (e.g., communicatively coupled wired or wirelessly to computing device 1102 via wired interface(s) 1180 and/or wireless modem(s) 1160). Further input devices 1130 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 1154 may display information, as well as operating as touch screen 1132 by receiving user commands and/or other information (e.g., by touch, finger gestures, virtual keyboard, etc.) as a user interface. Any number of each type of input device(s) 1130 and output device(s) 1150 may be present, including multiple microphones 1134, multiple cameras 1136, multiple speakers 1152, and/or multiple displays 1154.

One or more wireless modems 1160 can be coupled to antenna(s) (not shown) of computing device 1102 and can support two-way communications between processor 1110 and devices external to computing device 1102 through network 1104, as would be understood to persons skilled in the relevant art(s). Wireless modem 1160 is shown generically and can include a cellular modem 1166 for communicating with one or more cellular networks, such as a GSM network for data and voice communications within a single cellular network, between cellular networks, or between the mobile device and a public switched telephone network (PSTN). Wireless modem 1160 may also or alternatively include other radio-based modem types, such as a Bluetooth modem 1164 (also referred to as a "Bluetooth device") and/or Wi-Fi 1162 modem (also referred to as an "wireless adaptor"). Wi-Fi modem 1162 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 1164 is configured to communicate with another Bluetooth-capable device according to the Bluetooth short-range wireless technology standard(s) such as IEEE 802.15.1 and/or managed by the Bluetooth Special Interest Group (SIG).

Computing device 1102 can further include power supply 1182, LI receiver 1184, accelerometer 1186, and/or one or more wired interfaces 1180. Example wired interfaces 1180 include a USB port, IEEE 1194 (FireWire) port, a RS-232 port, an HDMI (High-Definition Multimedia Interface) port (e.g., for connection to an external display), a DisplayPort port (e.g., for connection to an external display), an audio port, an Ethernet port, and/or an Apple® Lightning® port, the purposes and functions of each of which are well known to persons skilled in the relevant art(s). Wired interface(s) 1180 of computing device 1102 provide for wired connections between computing device 1102 and network 1104, or between computing device 1102 and one or more devices/peripherals when such devices/peripherals are external to computing device 1102 (e.g., a pointing device, display 1154, speaker 1152, camera 1136, physical keyboard 1138, etc.). Power supply 1182 is configured to supply power to each of the components of computing device 1102 and may receive power from a battery internal to computing device 1102, and/or from a power cord plugged into a power port of computing device 1102 (e.g., a USB port, an A/C power port). LI receiver 1184 may be used for location determination of computing device 1102 and may include a satellite navigation receiver such as a Global Positioning System (GPS) receiver or may include other type of location determiner configured to determine location of computing device 1102 based on received information (e.g., using cell tower triangulation, etc.). Accelerometer 1186 may be present to determine an orientation of computing device 1102.

Note that the illustrated components of computing device 1102 are not required or all-inclusive, and fewer or greater numbers of components may be present as would be recognized by one skilled in the art. For example, computing device 1102 may also include one or more of a gyroscope, barometer, proximity sensor, ambient light sensor, digital compass, etc. Processor 1110 and memory 1156 may be co-located in a same semiconductor device package, such as being included together in an integrated circuit chip, FPGA, or system-on-chip (SOC), optionally along with further components of computing device 1102.

In embodiments, computing device 1102 is configured to implement any of the above-described features of flowcharts herein. Computer program logic for performing any of the operations, steps, and/or functions described herein may be stored in storage 1120 and executed by processor 1110.

In some embodiments, server infrastructure 1170 may be present in computing environment 1100 and may be communicatively coupled with computing device 1102 via network 1104. Server infrastructure 1170, when present, may be a network-accessible server set (e.g., a cloud-based environment or platform). As shown in FIG. 11, server infrastructure 1170 includes clusters 1172. Each of clusters 1172 may comprise a group of one or more compute nodes and/or a group of one or more storage nodes. For example, as shown in FIG. 11, cluster 1172 includes nodes 1174. Each of nodes 1174 are accessible via network 1104 (e.g., in a "cloud-based" embodiment) to build, deploy, and manage applications and services. Any of nodes 1174 may be a storage node that comprises a plurality of physical storage disks, SSDs, and/or other physical storage devices that are accessible via network 1104 and are configured to store data associated with the applications and services managed by nodes 1174. For example, as shown in FIG. 11, nodes 1174 may store application data 1178.

Each of nodes 1174 may, as a compute node, comprise one or more server computers, server systems, and/or computing devices. For instance, a node 1174 may include one or more of the components of computing device 1102 disclosed herein. Each of nodes 1174 may be configured to execute one or more software applications (or "applications") and/or services and/or manage hardware resources (e.g., processors, memory, etc.), which may be utilized by users (e.g., customers) of the network-accessible server set. For example, as shown in FIG. 11, nodes 1174 may operate application programs 1176. In an implementation, a node of nodes 1174 may operate or comprise one or more virtual machines, with each virtual machine emulating a system architecture (e.g., an operating system), in an isolated manner, upon which applications such as application programs 1176 may be executed.

In an embodiment, one or more of clusters 1172 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 1172 may be a datacenter in a distributed collection of datacenters. In embodiments, exemplary computing environment 1100 comprises part of a cloud-based platform such as Amazon Web Services® of Amazon Web Services, Inc. or Google Cloud Platform™ of Google LLC, although these are only examples and are not intended to be limiting.

In an embodiment, computing device 1102 may access application programs 1176 for execution in any manner, such as by a client application and/or a browser at computing device 1102. Example browsers include Microsoft Edge® by Microsoft Corp. of Redmond, Washington, Mozilla Firefox®, by Mozilla Corp. of Mountain View, California, Safari®, by Apple Inc. of Cupertino, California, and Google® Chrome by Google LLC of Mountain View, California.

For purposes of network (e.g., cloud) backup and data security, computing device 1102 may additionally and/or alternatively synchronize copies of application programs 1114 and/or application data 1116 to be stored at network-based server infrastructure 1170 as application programs 1176 and/or application data 1178. For instance, operating system 1112 and/or application programs 1114 may include a file hosting service client, such as Microsoft® OneDrive® by Microsoft Corporation, Amazon Simple Storage Service (Amazon S3)® by Amazon Web Services, Inc., Dropbox® by Dropbox, Inc., Google Drive™ by Google LLC, etc., configured to synchronize applications and/or data stored in storage 1120 at network-based server infrastructure 1170.

In some embodiments, on-premises servers 1192 may be present in computing environment 1100 and may be communicatively coupled with computing device 1102 via network 1104. On-premises servers 1192, when present, are hosted within an organization's infrastructure and, in many cases, physically onsite of a facility of that organization. On-premises servers 1192 are controlled, administered, and maintained by IT (Information Technology) personnel of the organization or an IT partner to the organization. Application data 1198 may be shared by on-premises servers 1192 between computing devices of the organization, including computing device 1102 (when part of an organization) through a local network of the organization, and/or through further networks accessible to the organization (including the Internet). Furthermore, on-premises servers 1192 may serve applications such as application programs 1196 to the computing devices of the organization, including computing device 1102. Accordingly, on-premises servers 1192 may include storage 1194 (which includes one or more physical storage devices such as storage disks and/or SSDs) for storage of application programs 1196 and application data 1198 and may include one or more processors for execution of application programs 1196. Still further, computing device 1102 may be configured to synchronize copies of application programs 1114 and/or application data 1116 for backup storage at on-premises servers 1192 as application programs 1196 and/or application data 1198.

Embodiments described herein may be implemented in one or more of computing device 1102, network-based server infrastructure 1170, and on-premises servers 1192. For example, in some embodiments, computing device 1102 may be used to implement systems, clients, or devices, or components/subcomponents thereof, disclosed elsewhere herein. In other embodiments, a combination of computing device 1102, network-based server infrastructure 1170, and/or on-premises servers 1192 may be used to implement the systems, clients, or devices, or components/subcomponents thereof, disclosed elsewhere herein.

As used herein, the terms "computer program medium," "computer-readable medium," and "computer-readable storage medium," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 1120. Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media. Embodiments are also directed to such communication media that are separate and non-overlapping with embodiments directed to computer-readable storage media.

As noted above, computer programs and modules (including application programs 1114) may be stored in storage 1120. Such computer programs may also be received via wired interface(s) 1180 and/or wireless modem(s) 1160 over network 1104. Such computer programs, when executed or loaded by an application, enable computing device 1102 to implement features of embodiments discussed herein. Accordingly, such computer programs represent controllers of the computing device 1102.

Embodiments are also directed to computer program products comprising computer code or instructions stored on any computer-readable medium or computer-readable storage medium. Such computer program products include the physical storage of storage 1120 as well as further physical storage types.

VII. Additional Example Embodiments

A system is described herein. The system includes a processor circuit and a memory. The memory stores program code that, when executed by the processor circuit, performs operations. The operations include receiving a respective digital access request from each of a plurality of entities. Each access request includes a respective proof. The operations further include, for each digital access request, obtaining a respective encrypted secret share from a respective first ledger database and validating the digital access request based at least on the respective encrypted secret share and the respective proof, without decrypting the respective encrypted secret share. The operations further include, in response to validating all of the digital access request, verifying that an access criteria of a security policy is met. The operations further include, in response to said verifying that the access criteria of the security policy is met, providing at least one of the entities with access to data protected by the security policy.

In one implementation of the foregoing system, each digital access request further includes a respective digest representative of a state of the respective first ledger database. For each digital access request, said obtaining the respective encrypted secret share from the respective first ledger database includes providing the respective digest to the respective first ledger database and receiving, from the respective first ledger database, a response indicating the respective digest is valid and comprising the respective encrypted secret share.

In one implementation of the foregoing system, each digital access request is signed by a respective private key of a respective one of the entities. The operations further include, for each digital access request, obtaining a respective public key corresponding to the respective private key from a respective second ledger database. For each digital access request, said validating the digital access request further comprises validating the signature of the digital access request using the respective public key.

In one implementation of the foregoing system, each digital access request further includes a respective digest representative of a state of the respective second ledger database. For each digital access request, said obtaining the respective public key corresponding to the respective private key from the respective second ledger database includes providing the respective digest to the respective second ledger database and receiving, from the respective second ledger database, a response indicating the respective digest is valid and comprising the respective public key.

In one implementation of the foregoing system, said providing the at least one of the entities with access to the data protected by the security policy includes decrypting the data protected by the security policy and providing the decrypted data to the at least one of the entities.

In one implementation of the foregoing system, said providing the at least one of the entities with access to the data protected by the security policy includes authorizing a data handler to decrypt the data protected by the security policy and provide the decrypted data to the at least one of the entities.

In one implementation of the foregoing system, the operations further include, prior to said receiving step, receiving a digital validation request from a user. The digital validation request includes a policy proof, an encrypted private key of the user, and the respective encrypted secret shares. The operations further include, prior to said receiving step, validating the digital validation request based at least on the policy proof, the encrypted private key, and the respective encrypted secret shares. The operations further include, prior to said receiving step and in response to validating the digital validation request, storing the data protected by the security policy.

In one implementation of the foregoing system, the operations further include receiving a digital validation request from the at least one of the entities, the digital validation request comprising a policy proof. The operations further include, for each respective encrypted secret share, obtaining the respective encrypted secret share from the respective first ledger database. The operations further include, obtaining an encrypted private key from a key manager. The operations further include, validating the digital validation request based at least on the policy proof, the respective encrypted secret shares, and the encrypted private key. The operations further include, in response to validating the digital validation request, notifying the at least one of the entities that the digital validation request is valid.

A computer-implemented method is also disclosed herein. The computer-implemented method includes receiving a respective digital access request from each of a plurality of entities, each access request comprising a respective proof. For each digital access request, a respective encrypted secret share is obtained from a respective first ledger database and the digital access request is validated based at least on the respective encrypted secret share and the respective proof, without decrypting the respective encrypted secret share. In response to validating all of the digital access request, a verification that an access criteria of a security policy is met is made. In response to said verifying that the access criteria of the security policy is met, at least one of the entities is provided with access to data protected by the security policy.

In one implementation of the foregoing method, each digital access request further includes a respective digest representative of a state of the respective first ledger database. For each digital access request, said obtaining the respective encrypted secret share from the respective first ledger database includes: providing the respective digest to the respective first ledger database; and receiving, from the respective first ledger database, a response indicating the respective digest is valid and including the respective encrypted secret share.

In one implementation of the foregoing method, each digital access request is signed by a respective private key of a respective one of the entities. The method further includes, for each digital access request: obtaining a respective public key corresponding to the respective private key from a respective second ledger database; and said validating the digital access request further includes validating the signature of the digital access request using the respective public key.

In one implementation of the foregoing method, each digital access request further comprises a respective digest representative of a state of the respective second ledger database. For each digital access request, said obtaining the respective public key corresponding to the respective private key from the respective second ledger database includes providing the respective digest to the respective second ledger database and receiving, from the respective second ledger database, a response indicating the respective digest is valid and comprising the respective public key.

In one implementation of the foregoing method, said providing the at least one of the entities with access to the data protected by the security policy comprises one of: decrypting the data protected by the security policy and providing the decrypted data to the at least one of the entities; or authorizing a data handler to decrypt the data protected by the security policy and provide the decrypted data to the at least one of the entities.

In one implementation of the foregoing method, the method further includes, prior to said receiving step: receiving a digital validation request from a user, the digital validation request including a policy proof, an encrypted private key of the user, and the respective encrypted secret shares; validating the digital validation request based at least on the policy proof, the encrypted private key, and the respective encrypted secret shares; and, in response to validating the digital validation request, storing the data protected by the security policy.

In one implementation of the foregoing method, the method further includes: receiving a digital validation request from the at least one of the entities, the digital validation request including a policy proof, for each respective encrypted secret share, obtaining the respective encrypted secret share from the respective first ledger database; obtaining an encrypted decryption key from a key manager; validating the digital validation request based at least on the policy proof, the respective encrypted secret shares, and the encrypted decryption key; and in response to validating the digital validation request, notifying the at least one of the entities that the digital validation request is valid.

A computer-readable storage medium having program instructions recorded thereon is also described herein. When executed by a processor circuit, the program instructions receive a respective digital access request from each of a plurality of entities. Each access request includes a respective proof. For each digital access request, the program instructions, when executed by the processor circuit, obtain a respective encrypted secret share from a respective first ledger database and validate the digital access request based at least on the respective encrypted secret share and the respective proof, without decrypting the respective encrypted secret share. In response to validating all of the digital access request, the program instructions, when executed by the processor circuit, verify that an access criteria of a security policy is met and, in response to said verifying that the access criteria of the security policy is met, provide at least one of the entities with access to data protected by the security policy.

In one implementation of the foregoing computer-readable storage medium, each digital access request further includes a respective digest representative of a state of the respective first ledger database. The program instructions, when executed by the processor circuit and for each digital access request, obtain the respective encrypted secret share from the respective first ledger database by: providing the respective digest to the respective first ledger database; and receiving, from the respective first ledger database, a response indicating the respective digest is valid and comprising the respective encrypted secret share.

In one implementation of the foregoing computer-readable storage medium, each digital access request is signed by a respective private key of a respective one of the entities. The program instructions, when executed by the processor circuit and for each digital access request: obtain a respective public key corresponding to the respective private key from a respective second ledger database; and validate the signature of the digital access request using the respective public key.

In one implementation of the foregoing computer-readable storage medium, the program instructions, when executed by the processor circuit, provide the at least one of the entities with access to the data protected by the security policy by authorizing a data handler to decrypt the data protected by the security policy and provide the decrypted data to the at least one of the entities.

In one implementation of the foregoing computer-readable storage medium, the program instructions, when executed by the processor circuit and prior to said receiving the respective digital access request from each of the plurality of entities: receive a digital validation request from a user, the digital validation request comprising a policy proof, an encrypted private key of the user, and the respective encrypted secret shares; validate the digital validation request based at least on the policy proof, the encrypted private key, and the respective encrypted secret shares; and in response to validating the digital validation request, store the data protected by the security policy.

VIII. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives modifying a condition or relationship characteristic of a feature or features of an implementation of the disclosure, should be understood to mean that the condition or characteristic is defined to within tolerances that are acceptable for operation of the implementation for an application for which it is intended. Furthermore, if the performance of an operation is described herein as being "in response to" one or more factors, it is to be understood that the one or more factors may be regarded as a sole contributing factor for causing the operation to occur or a contributing factor along with one or more additional factors for causing the operation to occur, and that the operation may occur at any time upon or after establishment of the one or more factors. Still further, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

Numerous example embodiments have been described above. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Furthermore, example embodiments have been described above with respect to one or more running examples. Such running examples describe one or more particular implementations of the example embodiments; however, embodiments described herein are not limited to these particular implementations.

Moreover, according to the described embodiments and techniques, any components of systems, computing devices, orchestrators, ledger databases, data handlers, verifiers, key managers, and/or proof generators and their functions may be caused to be activated for operation/performance thereof based on other operations, functions, actions, and/or the like, including initialization, completion, and/or performance of the operations, functions, actions, and/or the like.

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (or completely) concurrently with each other or with other operations.

The embodiments described herein and/or any further systems, sub-systems, devices and/or components disclosed herein may be implemented in hardware (e.g., hardware logic/electrical circuitry), or any combination of hardware with software (computer program code configured to be executed in one or more processors or processing devices) and/or firmware.

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described example embodiments, but should be defined only in accordance with the following claims and their equivalents.

What is claimed is:

1. A system, comprising:
a processor circuit; and
a memory that stores program code that, when executed by the processor circuit, performs operations, the operations comprising:
receiving a respective digital access request from each of a plurality of entities, each access request comprising a respective proof;
for each digital access request:
obtaining a respective encrypted secret share from a respective first ledger database; and
validating the digital access request based at least on the respective encrypted secret share and the respective proof, without decrypting the respective encrypted secret share;
in response to validating all of the digital access requests, verifying that an access criteria of a security policy is met; and
in response to said verifying that the access criteria of the security policy is met, providing at least one of the entities with access to data protected by the security policy.

2. The system of claim 1, wherein:
each digital access request further comprises a respective digest representative of a state of the respective first ledger database; and
for each digital access request, said obtaining the respective encrypted secret share from the respective first ledger database comprises:
providing the respective digest to the respective first ledger database; and
receiving, from the respective first ledger database, a response indicating the respective digest is valid and comprising the respective encrypted secret share.

3. The system of claim 1, wherein:
each digital access request is signed by a respective private key of a respective one of the entities; and
the operations further comprise:

for each digital access request, obtaining a respective public key corresponding to the respective private key from a respective second ledger database; and
for each digital access request, said validating the digital access request further comprises validating a signature of the digital access request using the respective public key.

4. The system of claim 3, wherein:
each digital access request further comprises a respective digest representative of a state of the respective second ledger database; and
for each digital access request, said obtaining the respective public key corresponding to the respective private key from the respective second ledger database comprises:
providing the respective digest to the respective second ledger database; and
receiving, from the respective second ledger database, a response indicating the respective digest is valid and comprising the respective public key.

5. The system of claim 1, wherein said providing the at least one of the entities with access to the data protected by the security policy comprises:
decrypting the data protected by the security policy; and
providing the decrypted data to the at least one of the entities.

6. The system of claim 1, wherein said providing the at least one of the entities with access to the data protected by the security policy comprises:
authorizing a data handler to decrypt the data protected by the security policy and provide the decrypted data to the at least one of the entities.

7. The system of claim 1, the operations further comprising, prior to said receiving step:
receiving a digital validation request from a user, the digital validation request comprising a policy proof, an encrypted private key of the user, and the respective encrypted secret shares;
validating the digital validation request based at least on the policy proof, the encrypted private key, and the respective encrypted secret shares; and
in response to validating the digital validation request, storing the data protected by the security policy.

8. The system of claim 1, the operations further comprising:
receiving a digital validation request from the at least one of the entities, the digital validation request comprising a policy proof;
for each respective encrypted secret share, obtaining the respective encrypted secret share from the respective first ledger database;
obtaining an encrypted private key from a key manager;
validating the digital validation request based at least on the policy proof, the respective encrypted secret shares, and the encrypted private key; and
in response to validating the digital validation request, notifying the at least one of the entities that the digital validation request is valid.

9. A computer-implemented method comprising:
receiving a respective digital access request from each of a plurality of entities, each access request comprising a respective proof;
for each digital access request:
obtaining a respective encrypted secret share from a respective first ledger database; and validating the digital access request based at least on the respective encrypted secret share and the respective proof, without decrypting the respective encrypted secret share;

in response to validating all of the digital access requests, verifying that an access criteria of a security policy is met; and in response to said verifying that the access criteria of the security policy is met, providing at least one of the entities with access to data protected by the security policy.

10. The computer-implemented method of claim 9, wherein:

each digital access request further comprises a respective digest representative of a state of the respective first ledger database; and for each digital access request, said obtaining the respective encrypted secret share from the respective first ledger database comprises:

providing the respective digest to the respective first ledger database; and receiving, from the respective first ledger database, a response indicating the respective digest is valid and comprising the respective encrypted secret share.

11. The computer-implemented method of claim 9, wherein:

each digital access request is signed by a respective private key of a respective one of the entities; and the method further comprises:

for each digital access request, obtaining a respective public key corresponding to the respective private key from a respective second ledger database; and for each digital access request, said validating the digital access request further comprises validating a signature of the digital access request using the respective public key.

12. The computer-implemented method of claim 11, wherein:

each digital access request further comprises a respective digest representative of a state of the respective second ledger database; and for each digital access request, said obtaining the respective public key corresponding to the respective private key from the respective second ledger database comprises:

providing the respective digest to the respective second ledger database; and receiving, from the respective second ledger database, a response indicating the respective digest is valid and comprising the respective public key.

13. The computer-implemented method of claim 9, wherein said providing the at least one of the entities with access to the data protected by the security policy comprises one of:

decrypting the data protected by the security policy and providing the decrypted data to the at least one of the entities; or authorizing a data handler to decrypt the data protected by the security policy and provide the decrypted data to the at least one of the entities.

14. The computer-implemented method of claim 9, further comprising, prior to said receiving step:

receiving a digital validation request from a user, the digital validation request comprising a policy proof, an encrypted private key of the user, and the respective encrypted secret shares;

validating the digital validation request based at least on the policy proof, the encrypted private key, and the respective encrypted secret shares; and in response to validating the digital validation request, storing the data protected by the security policy.

15. The computer-implemented method of claim 9, further comprising:

receiving a digital validation request from the at least one of the entities, the digital validation request comprising a policy proof;

for each respective encrypted secret share, obtaining the respective encrypted secret share from the respective first ledger database;

obtaining an encrypted decryption key from a key manager;

validating the digital validation request based at least on the policy proof, the respective encrypted secret shares, and the encrypted decryption key; and in response to validating the digital validation request, notifying the at least one of the entities that the digital validation request is valid.

16. A computer-readable storage medium having program instructions recorded thereon that, when executed by a processor circuit:

receive a respective digital access request from each of a plurality of entities, each access request comprising a respective proof;

for each digital access request:

obtain a respective encrypted secret share from a respective first ledger database; and validate the digital access request based at least on the respective encrypted secret share and the respective proof, without decrypting the respective encrypted secret share;

in response to validating all of the digital access requests, verify that an access criteria of a security policy is met; and in response to said verifying that the access criteria of the security policy is met, provide at least one of the entities with access to data protected by the security policy.

17. The computer-readable storage medium of claim 16, wherein:

each digital access request further comprises a respective digest representative of a state of the respective first ledger database; and the program instructions, when executed by the processor circuit and for each digital access request, obtain the respective encrypted secret share from the respective first ledger database by:

providing the respective digest to the respective first ledger database; and receiving, from the respective first ledger database, a response indicating the respective digest is valid and comprising the respective encrypted secret share.

18. The computer-readable storage medium of claim 16, wherein:

each digital access request is signed by a respective private key of a respective one of the entities; and the program instructions, when executed by the processor circuit and for each digital access request:

obtain a respective public key corresponding to the respective private key from a respective second ledger database; and validate a signature of the digital access request using the respective public key.

19. The computer-readable storage medium of claim 16, wherein the program instructions, when executed by the processor circuit, provide the at least one of the entities with access to the data protected by the security policy by:
- authorizing a data handler to decrypt the data protected by the security policy and provide the decrypted data to the at least one of the entities.

20. The computer-readable storage medium of claim 16, the program instructions, when executed by the processor circuit and prior to said receiving the respective digital access request from each of the plurality of entities:
- receive a digital validation request from a user, the digital validation request comprising a policy proof, an encrypted private key of the user, and the respective encrypted secret shares;
- validate the digital validation request based at least on the policy proof, the encrypted private key, and the respective encrypted secret shares; and
- in response to validating the digital validation request, store the data protected by the security policy.

* * * * *